(12) United States Patent
Reineke

(10) Patent No.: US 10,919,604 B2
(45) Date of Patent: Feb. 16, 2021

(54) SPROCKET CARRIER AND MULTIPLE SPROCKET ARRANGEMENT

(71) Applicant: SRAM DEUTSCHLAND GmbH, Schweinfurt (DE)

(72) Inventor: Sebastian Reineke, Schweinfurt (DE)

(73) Assignee: SRAM DEUTSCHLAND GMBH, Schweinfurt (DE)

( * ) Notice: Subject to any disclaimer, the term of this patent is extended or adjusted under 35 U.S.C. 154(b) by 352 days.

(21) Appl. No.: 16/114,554

(22) Filed: Aug. 28, 2018

(65) Prior Publication Data

US 2019/0061875 A1     Feb. 28, 2019

(30) Foreign Application Priority Data

Aug. 28, 2017 (DE) ..................... 10 2017 008 074.7

(51) Int. Cl.
| | |
|---|---|
| *B62M 9/126* | (2010.01) |
| *B62M 9/10* | (2006.01) |
| *B62M 9/132* | (2010.01) |
| *F16D 1/108* | (2006.01) |
| *B62M 25/08* | (2006.01) |
| *F16D 1/10* | (2006.01) |

(52) U.S. Cl.
CPC ............. *B62M 9/126* (2013.01); *B62M 9/10* (2013.01); *B62M 9/105* (2013.01); *B62M 9/132* (2013.01); *F16D 1/108* (2013.01); *B62M 25/08* (2013.01); *F16D 2001/103* (2013.01)

(58) Field of Classification Search
CPC .......... B62M 9/10; B62M 9/12; B62M 3/003; B62M 9/121; F16H 55/30

USPC ........................................................ 474/160
See application file for complete search history.

(56) References Cited

U.S. PATENT DOCUMENTS

| | | | |
|---|---|---|---|
| 4,121,474 A | 10/1978 | Arregui Suinaga | |
| 4,353,447 A | 10/1982 | Bes | |
| 4,380,445 A | 4/1983 | Shimano | |
| 4,472,163 A | 9/1984 | Bottini | |
| 5,194,051 A * | 3/1993 | Nagano | B62M 9/10 474/160 |
| 5,788,593 A | 8/1998 | Tiong | |
| 6,024,662 A * | 2/2000 | Fujimoto | B62M 3/003 280/261 |
| 6,428,437 B1 * | 8/2002 | Schlanger | B62M 9/10 474/160 |
| 6,503,600 B2 | 1/2003 | Watanabe et al. | |
| 8,696,503 B2 * | 4/2014 | Oishi | B62M 9/125 474/160 |
| 8,764,594 B2 * | 7/2014 | Dal Pra' | B62M 9/10 474/160 |
| 8,821,330 B2 * | 9/2014 | Dal Pra' | B62M 9/10 474/160 |
| 8,905,878 B2 * | 12/2014 | Loy | B62M 9/10 474/160 |

(Continued)

FOREIGN PATENT DOCUMENTS

DE     102016008594     1/2018

*Primary Examiner* — Henry Y Liu

(57) ABSTRACT

A multiple sprocket arrangement for rotatable mounting on a rear wheel axle may include a sprocket carrier. The sprocket carrier has a substantially uniform material thickness. The multiple sprocket arrangement includes smaller sprockets and larger sprockets. The sprocket carrier is formed so that at least three larger sprockets can be fastened to the carrier.

20 Claims, 21 Drawing Sheets

(56) References Cited

U.S. PATENT DOCUMENTS

| | | | |
|---|---|---|---|
| 8,911,314 B2* | 12/2014 | Braedt | B62M 9/10 474/160 |
| 8,956,254 B2* | 2/2015 | Tokuyama | B62M 9/12 474/160 |
| 8,968,130 B2* | 3/2015 | Liao | B62M 9/10 474/160 |
| 9,868,491 B1* | 1/2018 | Oishi | B62M 9/12 |
| 2003/0073531 A1 | 4/2003 | Tseng | |
| 2005/0090349 A1 | 4/2005 | Lee | |
| 2005/0272546 A1 | 12/2005 | Reiter | |
| 2006/0063624 A1 | 3/2006 | Voss | |
| 2008/0004143 A1 | 1/2008 | Kanehisa et al. | |
| 2008/0058144 A1 | 3/2008 | Oseto et al. | |
| 2008/0188336 A1* | 8/2008 | Tokuyama | B62M 9/10 474/160 |
| 2008/0231014 A1* | 9/2008 | Braedt | B62M 9/10 280/260 |
| 2009/0042681 A1* | 2/2009 | Dal Pra' | B62M 9/10 474/160 |
| 2009/0191996 A1 | 7/2009 | D'Aluisio | |
| 2009/0215566 A1 | 8/2009 | Braedt | |
| 2010/0099530 A1* | 4/2010 | Chiang | B62M 9/10 474/160 |
| 2011/0105263 A1 | 5/2011 | Braedt | |
| 2016/0272279 A1 | 9/2016 | Yoshida et al. | |
| 2017/0370461 A1* | 12/2017 | Lo | F16H 55/30 |

\* cited by examiner

SPROCKET CARRIER AND MULTIPLE SPROCKET ARRANGEMENT

This application claims priority to, and/or the benefit of, German patent application DE 10 2017 008 074.7, filed Aug. 28, 2017, the contents of which are referenced herein in their entirety.

FIELD OF THE INVENTION

The invention relates to a multiple sprocket arrangement for mounting on a rear wheel hub with an increased number of sprockets and a chain ring carrier.

BACKGROUND

The number of sprockets on rear multiple sprocket arrangements has been constantly increasing in recent years. Eleven or twelve sprockets in combination with one, two or three front chain rings represent popular bicycle drives. More modern drives even use thirteen or fourteen sprockets, usually in combination with one or two front chain rings. However, the increased number of sprockets brings with it its own problems. The axial total width, the weight and also the manufacturing costs of the multiple sprocket arrangement thus increase with the rising number of sprockets.

In addition to the number of sprockets, the size of the sprockets and their numbers of teeth have also increased. The largest sprockets regularly include a number of 42 or more teeth. The largest sprocket can have 50 teeth or more. The weight increases further in association with the increased diameter of the sprockets. Particularly large sprockets are furthermore more prone to buckling under the action of the chain forces which are transmitted by the chain via the sprockets and the driver to the rear wheel hub. The installation space available is simultaneously specified and restricted in the axial direction by the driver, the running wheels spokes and the frame connection.

Multiple sprockets on rear wheels of modern bicycles are usually mounted on a driver on the rear wheel hub which is mounted rotatably with respect to the hub axle and with respect to the hub sleeve, wherein a freewheel is provided between driver and hub sleeve. Drivers have standard dimensions so that the multiple sprockets are exchangeable.

Various approaches are known from the prior art which solve only one or a few of the above-mentioned problems. However, no multiple sprocket arrangement with an increased number of 11, 12 or more sprockets is known which can be produced to be lightweight, stable and of low cost and has an axial width which allows mounting on a specified standard driver.

It is, for example, known to generate lightweight, conical sprocket arrangements by machining production, in particular milling or turning. This production is very material- and time-intensive and thus also expensive. Narrow, annular sprockets on a large radius are connected integrally or by means of pins to one another, wherein the radial support with respect to the driver is carried out at two points spaced apart axially from one another. These are optimum in terms of weight and stability. However, the production costs are high.

Lower cost embodiments can comprise sprocket carriers (spiders) to which several sprockets are fastened. These have, however, been shown to be heavy and/or unstable. Moreover, they are not yet sufficient for all precision requirements in the case of large numbers of teeth.

Single sprockets with a large outer diameter and a small inner diameter with a profile for the transmission of torque to the driver tend in particular to warping with respect to the central plane of the sprocket. The exact axial position of the teeth can correspondingly not be adhered to. They furthermore have a very high weight. The object thus arises of providing a rear multiple sprocket arrangement which is low-cost, easy to manufacture, sufficiently stable and nevertheless lightweight. This object is achieved with a sprocket carrier for a multiple sprocket arrangement.

SUMMARY

In an embodiment, a multiple sprocket arrangement for rotatable mounting on a rear wheel axle and for engagement in a bicycle chain is provided. The multiple sprocket arrangement includes a number of sprockets including smaller sprockets and larger sprockets. The multiple sprocket arrangement also includes a sprocket carrier having a substantially uniform material thickness, and a multiplicity of carrier arms which are connected to and extend between an inner ring and an outer ring in a radial direction. The carrier arms have carrier steps formed therein configured for attachment of at least two of the larger sprockets.

DETAILED DESCRIPTION OF THE DRAWINGS

Figure 1:
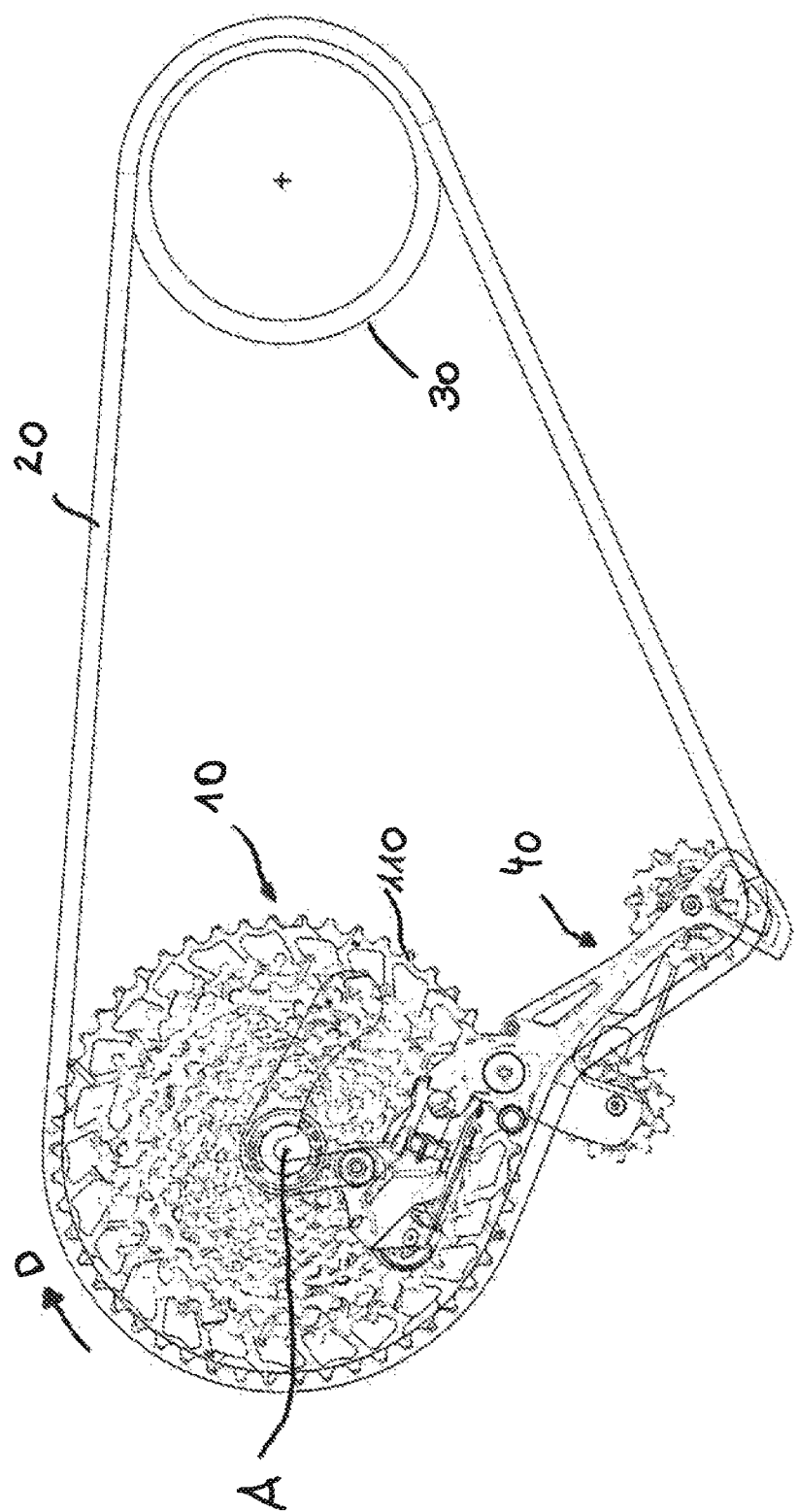
FIG. 1 shows a schematic representation of a bicycle drive.

A sprocket carrier for use in a multiple sprocket arrangement for rotatable mounting on a rear wheel axle has a substantially uniform material thickness. Uniform material thickness refers to the material thickness in the axial direction. In other words, the material thickness refers to the thickness of the sheet metal from which the carrier is formed. This characteristic allows on one hand low-cost production and also a low weight as a result of the continuously small material thickness. The original material thickness is selected here so that a good balance is found between stability and weight. In particular, the carrier may be produced from an aluminium sheet, which is originally of uniform thickness, in a multi-stage stamping/bending process. By deforming the initially flat sheet metal part, various levels or steps are generated which give the sprocket carrier the required stability. The axial total height (or total width) of the carrier is substantially larger than the thickness of the initial material after deformation. The material thickness refers to the thickness of the material, and not the axial total height of the carrier. The material thickness can vary slightly in some regions of the carrier. The profile for the transmission of torque is thus formed to be slightly stronger and the projections to be slightly less strong. The material thickness of the carrier is nevertheless substantially uniform and differs significantly from the axial total height or total width of the carrier. In an embodiment, the aluminium is only hardened after the stamping/bending process. As a result, it can initially easily be machined and offers sufficient stability after hardening.

In an embodiment, the sprocket carrier has a profile for the transmission of torque at one radially inner end. An inner ring is formed in the radial direction adjacent to the profile for the transmission of torque. The profile is formed for engagement with the driver. For improved transmission of the forces to the driver, the axial material thickness at the profile is slightly larger than throughout the rest of the carrier, i.e. it is slightly larger than the initial material thickness.

In an embodiment, the carrier has a multiplicity of carrier arms. The carrier arms are connected at a radially outer end of the carrier by an outer ring. In particular a number of five carrier arms are provided which are arranged at uniform angular distances.

In an embodiment, the carrier arms extend in the radial direction between the inner ring and the outer ring. The outer ring offers more stability in comparison with conventional spiders, the carrier arms of which are not connected at the radially outer end. A plurality of material gaps which are arranged both in the region of the carrier arms and in the rest of the region between the inner and outer ring of the carrier significantly reduces the weight in comparison with a continuous disc. To a certain extent, the sprocket carrier in an embodiment represents a mixed form between a round disc and an arrangement of several arms proceeding from the fastening point on the driver.

In another embodiment, the carrier has a multiplicity of carrier projections at the radially outer end or along the outer ring. The carrier projections extend radially outwards. They serve the purpose of overlapping attachment of a first large, in particular largest chain ring on the axial carrier inboard side and/or of a second large chain ring on the axial carrier outboard side. In particular, a number of ten carrier projections is provided. These can be arranged at uniform angular distances. In particular, every second one of the ten carrier projections in the circumferential direction can be assigned to one of the five carrier arms. In other words, a carrier projection adjoins each carrier arm in the radial direction. A carrier projection can also be arranged at the radially outer end or along the outer ring between respectively adjacent projections adjoining each of the carrier arms.

In an embodiment, the carrier has a multiplicity of webs for support. The webs extend between the outer ring and the inner ring. The webs serve to absorb and pass on force. The webs extend in particular in each case from the outer ring in the region of a carrier projection arranged between the carrier arms to an adjacent carrier arm in the circumferential direction. As seen in the direction of rotation D of the multiple sprocket arrangement, the adjacent carrier arm lies in front of the carrier projection so that webs extend obliquely forwards. As a result of this alignment, the webs act like compression members and can absorb forces and tensions which are transmitted from the chain to the largest sprocket or the second largest sprocket and pass them on radially inwards in the direction of the driver. Forces which are introduced into the third and fourth sprocket are conducted directly via the carrier arms to the driver. The intermediate spaces between adjacent carrier arms could also be formed to be free from material (lightweight but unstable) or completely closed (stable but heavy). The webs represent a good compromise between strength and weight.

One embodiment relates to a sprocket sub-assembly for a multiple sprocket arrangement for rotatable mounting on a rear wheel axle and for engagement in a bicycle chain, the sub-assembly comprising a sprocket carrier and at least three large sprockets mounted on the carrier. Large sprockets have an increased number of teeth, in particular 32 teeth or more. One embodiment is directed precisely at the attachment of such large sprockets because the problems described above in terms of stability and weight are at their greatest there. In particular, the three largest sprockets of the multiple sprocket arrangement are mounted on the carrier.

In an embodiment, the carrier has a multiplicity of first, second and third carrier steps to which in each case a first, second and third sprocket on the carrier can be attached. The carrier has first carrier steps on the axial inboard side for attachment of the first chain ring, in particular for attachment of the largest chain ring, to the radially outer end of the carrier or, to be more precise, to the outer ring of the carrier. The carrier has further second carrier steps on the axial outboard side for attachment of the second chain ring, in particular for attachment of the second largest chain ring, to the radially outer end of the carrier or, to be more precise, to the outer ring of the carrier. The carrier has third carrier steps for attachment of the third chain ring, in particular for attachment of the third largest chain ring on the axial outboard side in the region of the carrier arms, to be more precise, to the radially outer end of the carrier arms, but still radially within the carrier projections. In particular, the carrier has first carrier steps for attachment of the largest sprocket in the form of impressions on the axial inboard side of the carrier projections. The carrier has further second carrier steps for attachment of the second largest sprocket on an axial outboard side of the carrier projections. The term inboard side refers to the side of the carrier or the chain rings facing the bicycle spokes or the driver stop in the mounted state. The outboard side is correspondingly the side of the carrier and of the chain rings facing away from it.

In an embodiment, the sprocket sub-assembly comprises a fourth sprocket. The fourth sprocket is in particular the fourth largest sprocket. The carrier has fourth carrier steps for attachment of the fourth largest chain ring on the outboard side of the carrier in the region of the radially outer ends of the carrier arms.

In an embodiment, the first, second, third and fourth sets of carrier steps each lie on different levels in the axial direction. The multiplicity of ten first carrier steps lies in the axial direction on the same first level and extends, in the mounted state, perpendicular to rear wheel axle A. The multiplicity of in particular ten second carrier steps lies in the axial direction on the same second level and extends, in the mounted state, perpendicular to rear wheel axle A. The multiplicity of in particular five third carrier steps lies in the axial direction on the same third level and extends, in the mounted state, perpendicular to rear wheel axle A. The multiplicity of in particular five fourth carrier steps lies in the axial direction on the same fourth level and extends, in the mounted state, perpendicular to rear wheel axle A. The third and fourth carrier steps are arranged offset to one another in the circumferential direction on the carrier arm. This means that they do not lie on a line in the radial direction. This saves space and facilitates the production of carrier steps in the metal forming process. The carrier steps are produced consecutively in several steps of the multi-stage stamping/bending process. The deformations of the carrier steps contribute to the stability of the carrier. On the other hand, the arrangement of the sprockets on the carrier steps on different levels in each case results in an axial spacing apart of the sprockets.

In an embodiment, the carrier steps in each case have a rivet receiving hole. The ten carrier projections, and thus the first and second carrier steps, each have only one joint rivet receiving hole for fastening of the first and second chain ring. In contrast, the five third and fourth carrier steps each have rivet receiving holes for fastening of the third chain ring and further rivet receiving holes for fastening of the fourth chain ring. In particular, rivet receiving holes are arranged offset to one another in the circumferential direction along a carrier arm. They therefore do not lie on a line in the radial direction. The offset of the rivet receiving holes saves space and simplifies production.

In an embodiment, the first or largest sprocket has, along its radially outer circumference, an outer ring with a multiplicity of teeth. It furthermore has an inner ring at its radially inner end.

In an embodiment, a multiplicity of sprocket webs extend from the outer ring to the inner ring. Similarly to the carrier, these sprocket webs serve to support and stabilize the sprocket. The webs serve to absorb or pass on force. As seen in direction of rotation D of the multiple sprocket arrangement, the sprocket webs extend at a similar angle to the carrier webs: obliquely forwards. As a result of this alignment, the webs act like compression members and can absorb forces and tensions which are transmitted from the chain to the sprocket and pass them on radially inwards in the direction of the carrier. A solidly formed sprocket without gaps would be more stable, but also much heavier. The sprocket webs represent a good compromise between strength and weight. The same principle applies to the second largest and/or the other sprockets. However, this embodiment is particularly important in the case of the largest sprockets with 36 or more teeth.

In an embodiment, a multiplicity of sprocket projections with in each case one rivet receiving hole are arranged along the inner ring of the first sprocket. The sprocket projections extend radially inwards. The in particular ten chain ring projections are distributed evenly along the inner circumference and are matched to the carrier projections of the sprocket carrier. In the mounted state of the largest sprocket, the projections, and the rivet receiving holes of the first sprocket and of the carrier, overlap. The largest sprocket is mounted on the inboard side of the carrier so that the projections of the carrier are arranged in the axial direction further to the outside than the corresponding projections of the sprocket. This overlapping contributes to the increase in stability. In the case of arrangements with an increased number of sprockets, the oblique running of the chain is particularly great at the largest sprocket. The sprocket is pulled to the outside by the obliquely running chain. The overlapping projections of the carrier counteract this. The overlapping region of the carrier projections is significantly larger than the overlapping region of the rivet receiving holes or rivet head depressions. In order to save weight, both the carrier and the large sprockets have a plurality of gaps.

An embodiment relates to a sprocket sub-assembly for a multiple sprocket arrangement for rotatable mounting on a rear wheel axle and for engagement in a bicycle chain, the sub-assembly comprising a sprocket carrier and at least three large sprockets mounted on the carrier, and a multiplicity of further sprockets. The further sprockets are smaller than the large sprockets, having 36 or fewer teeth. In particular, seven or eight further sprockets can be formed as single sprockets which extend in the radial direction inwardly to the driver and engage it in a torque-transmitting manner. In an embodiment, the multiple sprocket arrangement comprises a total of at least eleven sprockets. In particular, embodiments with a total of twelve sprockets offer a good selection of transmission ratios. A total of thirteen sprockets is also possible.

In an embodiment, the largest sprocket of the multiple sprocket arrangement has at least 48 teeth. Largest sprockets with 50 or 51 teeth are also possible. The smallest sprocket has at most eleven teeth. In particular, the smallest sprocket has ten or nine teeth. A particularly expedient transmission range is achieved in the case of embodiments with 50 or 51 teeth on the largest sprocket and ten or eleven teeth on the smallest sprocket. The two largest sprockets of the multiple sprocket arrangement may have 50 or 42 teeth on the outer periphery for engagement with the roller chain. They thus have a dimension which is already known from front chain rings and is also mastered. However, the demands in the case of a front chain ring which is mounted on a pedal crank or on a crank spider are not equivalent to the demands on a rear sprocket which is fastened on a driver of a cassette hub of a rear wheel. The known chain rings on front pedal cranks are mounted symmetrically to the so-called "chain line". The normal maximum number of front chain rings is three.

In another embodiment, the remaining single sprockets reach in the radial direction, not as shown in the figures, up to the driver. A torque is not transmitted directly, but rather indirectly to a driver. An indirect transmission of torque is possible by means of a further sprocket carrier (spider). Another possibility is to derive the torque via the adjacent sprockets up to a sprocket or sub-assembly connected to the driver in a torque-transmitting manner. In this manner, the sprocket bodies of the sprockets which do not transmit any torque can be formed to be annular and weight can be saved. Adjacent single sprockets could be connected by means of axially extending connection means. In particular, these connection means may be pins.

The present invention furthermore relates to a bicycle drive—for example as shown in FIG. 1—with a multiple sprocket arrangement according to the embodiments described above, a rear derailleur and a front chain ring arrangement with at least one, in particular precisely one front, fixed chain ring.

FIG. 1 illustrates a schematic representation of a bicycle drive. The front chain ring arrangement comprises a single, fixed, chain ring 30. Multiple sprocket arrangement 10 comprises twelve sprockets with a largest sprocket 110 and eleven further sprockets with different diameters or a different number of teeth. In the state shown, bicycle chain 20 is in engagement with the teeth of chain ring 30 and with the teeth of largest sprocket 110 of multiple sprocket arrangement 10. A force is transmitted from front chain ring 30 to rear multiple sprocket arrangement 10 and from there via a driver to the rear wheel hub by means of bicycle chain 20 in direction of rotation D. Multiple sprocket arrangement 10 rotates about axis A which corresponds to the rear wheel axle. Rear derailleur 40 moves bicycle chain 20 during shifting from one sprocket to an adjacent sprocket. The rear derailleur can be operated either mechanically or electrically. In the embodiment shown with only one chain ring 30, the front derailleur is omitted.

In the case of embodiments with several chain rings, the front derailleur can also be operated electrically, for example in a cable-free manner. The indications of direction used below, front/rear, relate to a bicycle in the direction of travel. The teeth are arranged on the radial outside on a sprocket. The profile for the transmission of torque is arranged on the radial inside on a sprocket or on the sprocket carrier. The small sprockets are arranged further to the axial outside than the large sprockets. Largest sprocket 110 is arranged axially further to the inside than the remaining sprockets. The axial inboard side of the sprockets and of the sprocket carrier points, in the mounted state, in the direction of the bicycle spokes. The axial outboard side points away from the bicycle spokes.

Figure 2:
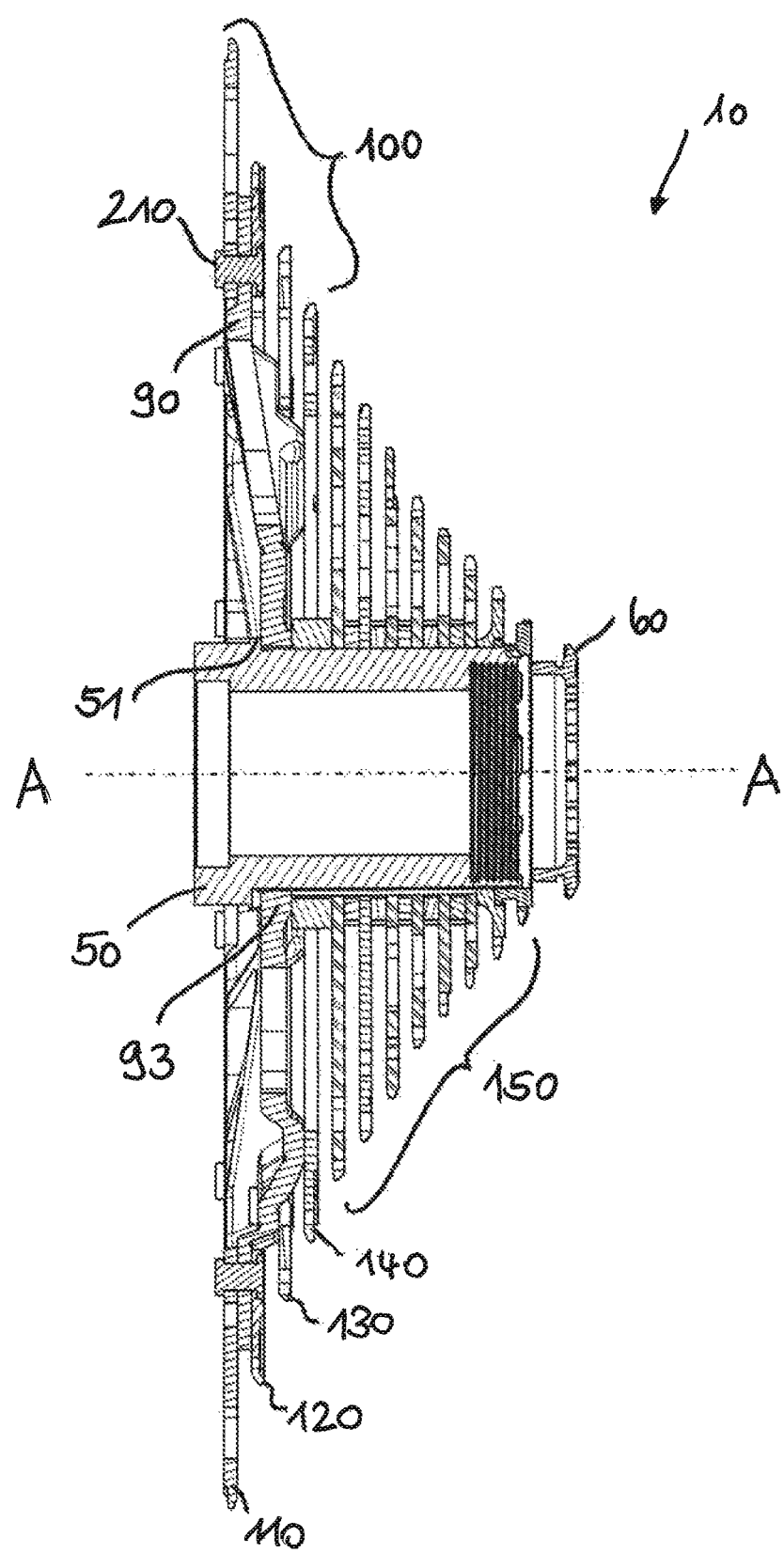
FIG. 2 shows a section through a multiple sprocket arrangement mounted on a driver.

FIG. 2 shows a sectional view of an embodiment of the multiple sprocket arrangement 10 mounted on a driver 50. Driver 50 can normally be mounted on the rear wheel hub and is borne rotatably with respect to the hub axle and with respect to the hub sleeve, wherein a freewheel is provided between driver 50 and the hub sleeve. Drivers 50 normally have a profile for the transmission of torque between sprocket arrangement 10 and driver 50. The profile of the driver has standard dimensions so that sprocket arrangement 10 is exchangeable. To mount, multiple sprocket arrangement 10 is pushed in the axially inboard direction onto driver 50 until it strikes against driver stop 51. In the embodiment shown, the radially inner region of sprocket carrier 90 bears against driver stop 51. A lock ring 60 with an external thread is screwed into an internal thread of driver 50 and serves to axially fasten multiple sprocket arrangement 10 onto driver 50. The axial installation space between driver stop 51 and a bicycle frame, not shown here, is restricted by the standard dimensions of the driver and does not provide sufficient space to bring twelve sprockets directly into torque-transmitting engagement with driver 50. This problem is solved by sprocket carrier 90 which is formed at an angle. At the radially inner end of sprocket carrier 90 there is a profile 93 for torque-transmitting engagement with the corresponding profile on the driver 50. At the radially outer end of sprocket carrier 90, first chain ring 110 and second chain ring 120 are fastened with rivets 210. As a result of the angled nature of carrier 90, the radially inner end of carrier 90 lies, in the mounted state, axially further to the outside than the radially outer end of carrier 90. The radially inner end of carrier 90 bears against the axial outside of driver stop 51, and is therefore arranged axially outboard of driver stop 51. In comparison, the radially outer end of carrier 90, carrying first and second sprockets 110, 120, lies axially further inboard than driver stop 51, and is therefore arranged axially on the inside of driver stop 51. With respect to overhanging sprockets 110, 120 in relation to driver stop 51, this overhanging configuration allows an arrangement of twelve sprockets on a standard driver 50 despite the restricted installation space. Other sprockets 130, 140, 150 are, in the mounted state, positioned axially further outboard than driver stop 51.

In this embodiment, the smallest sprocket has eleven teeth. This has the advantage that its inner circumference is large enough to adapt to the outer circumference of a standard driver 50. By contrast, sprockets with ten or fewer teeth must be fitted on a special driver or in a self-supporting manner (axially on the outside) next to the driver.

The spokes which extend from the spoke flange on the hub sleeve to the rear wheel rim are inclined with respect to the central plane of the rear wheel (not shown here). Extending from the spoke flange on the hub sleeve, the spokes gradually approach the central plane of the rear wheel closer to the rear wheel rim. This opens up the possibility of providing very large sprockets axially inboard of driver stop 51 on driver 50 without collisions occurring between sprocket 110 and spokes. The chain guide of a rear derailleur 40 can also be displaced, for the purpose of gear shifting, without the chain guide touching the spokes at the axial position of largest sprocket 110.

Figure 3A:
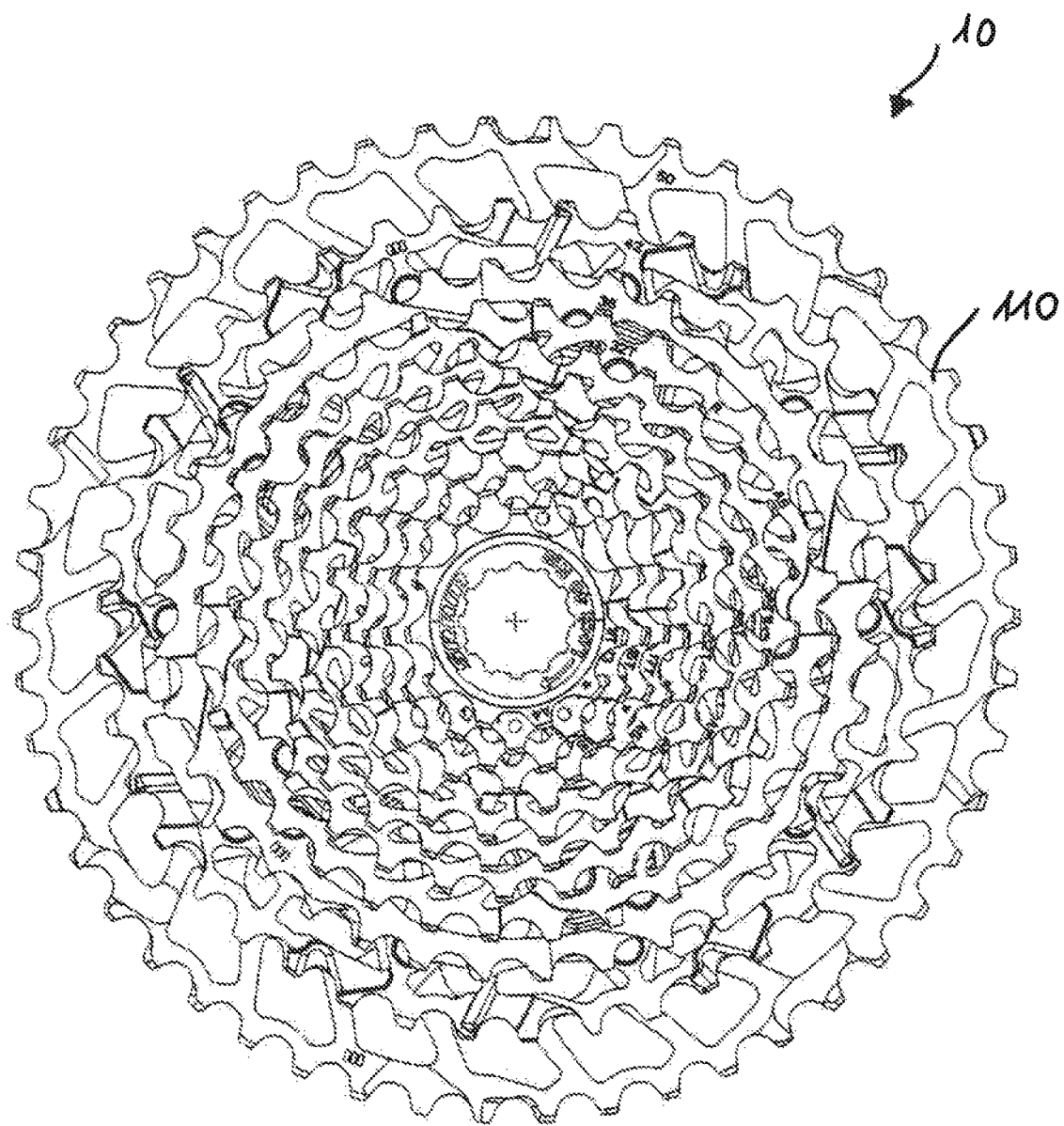
FIG. 3*a* shows an outboard view of a multiple sprocket arrangement.

FIG. 3a shows an outboard view of an embodiment of a multiple sprocket arrangement 10 with twelve sprockets. Largest sprocket 110 has a total of 50 teeth. The following sprockets have, in sequence, 42, 36, 32, 28, 25, 22, 19, 17, 15, 13 and 11 teeth.

Figure 3B:
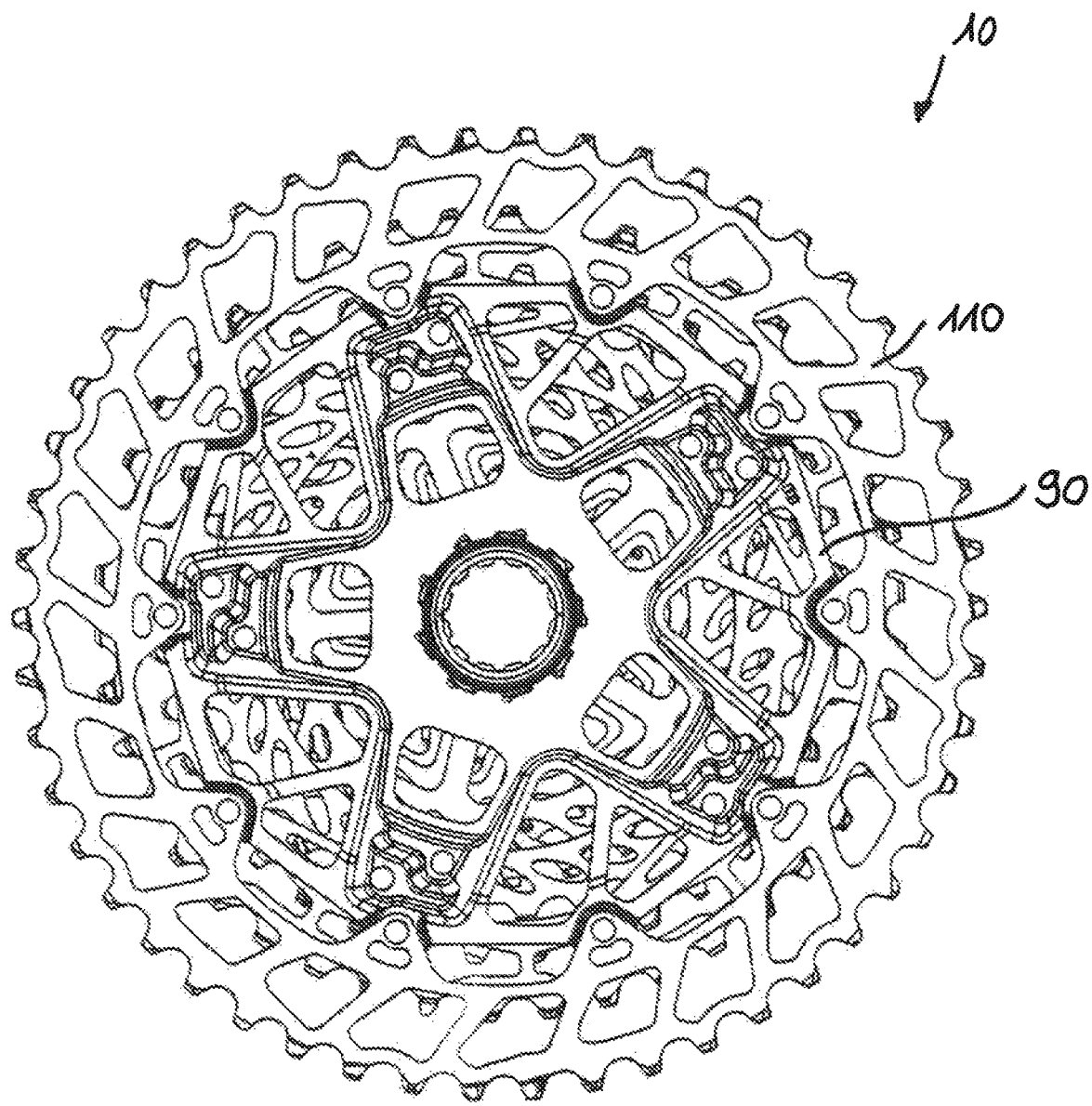
FIG. 3*b* shows an inboard view of the multiple sprocket arrangement from FIG. 3*a*.

FIG. 3b shows the inboard view of multiple sprocket arrangement 10 from FIG. 3a. Here, sprocket carrier 90 with its five arms is clearly apparent. Largest sprocket 110 is fastened on the inboard side of carrier 90 with a plurality of rivets.

Figure 3C:
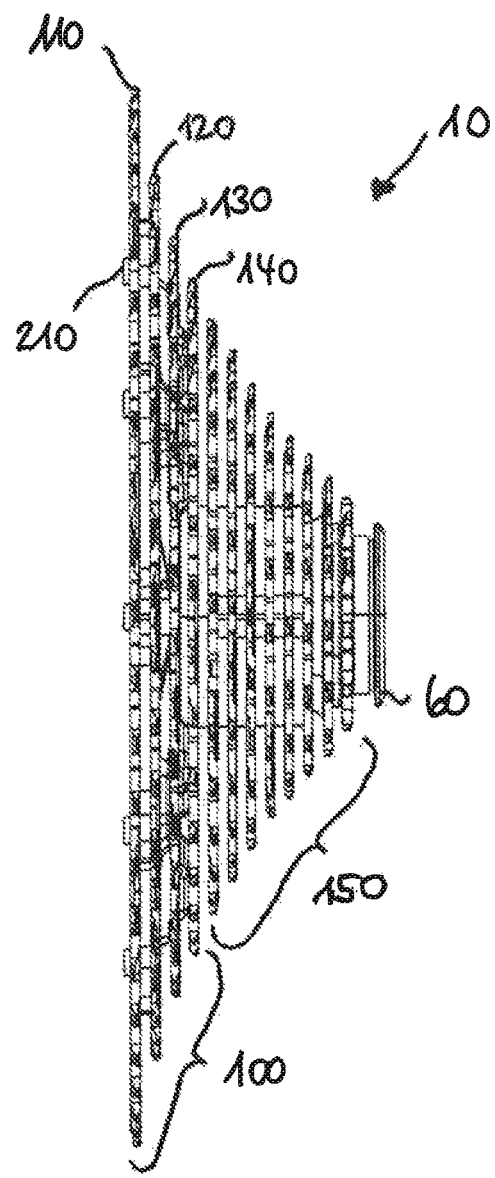
FIG. 3*c* shows a side view of the multiple sprocket arrangement from FIG. 3*a*.

FIG. 3c shows a side view of multiple sprocket arrangement 10 from FIG. 3a. Four largest sprockets 110, 120, 130, 140 are fastened to carrier 90 with a plurality of rivets 210 and form sprocket sub-assembly 100 together with carrier 90. Here, largest sprocket 110 is fastened on the inboard side of carrier 90 and second sprocket 120 is fastened on the outboard side of carrier 90 with a plurality of rivets 210. Second and third sprocket 130, 140 are also arranged on the outboard side of carrier 90 and fastened with rivets 210. The four largest sprockets 110, 120, 130, 140 are formed as chain rings and extend radially inward only up to the corresponding carrier steps of carrier 90. Carrier 90 is in torque-transmitting engagement with driver 50. The torque of the large sprockets is therefore transmitted via carrier 90 to driver 50. This embodiment of the sprockets saves material and thus also weight. This is important particularly in the case of the largest sprockets. The remaining eight smaller, and thus also more lightweight, sprockets 150 each extend radially inward to driver 50 and are directly in torque-transmitting engagement with it.

A further aspect is the behavior during heat treatment of the sprockets. Sprockets with a large outer diameter and small inner diameter of the inner periphery having a profile for the transmission of torque to the driver tend to warp with respect to the central plane of the sprocket. The exact axial position of the teeth cannot be correspondingly maintained. The smaller, annular sprockets 110, 120, 130 and 140 on carrier 90 are less susceptible to warping.

Figure 3D:
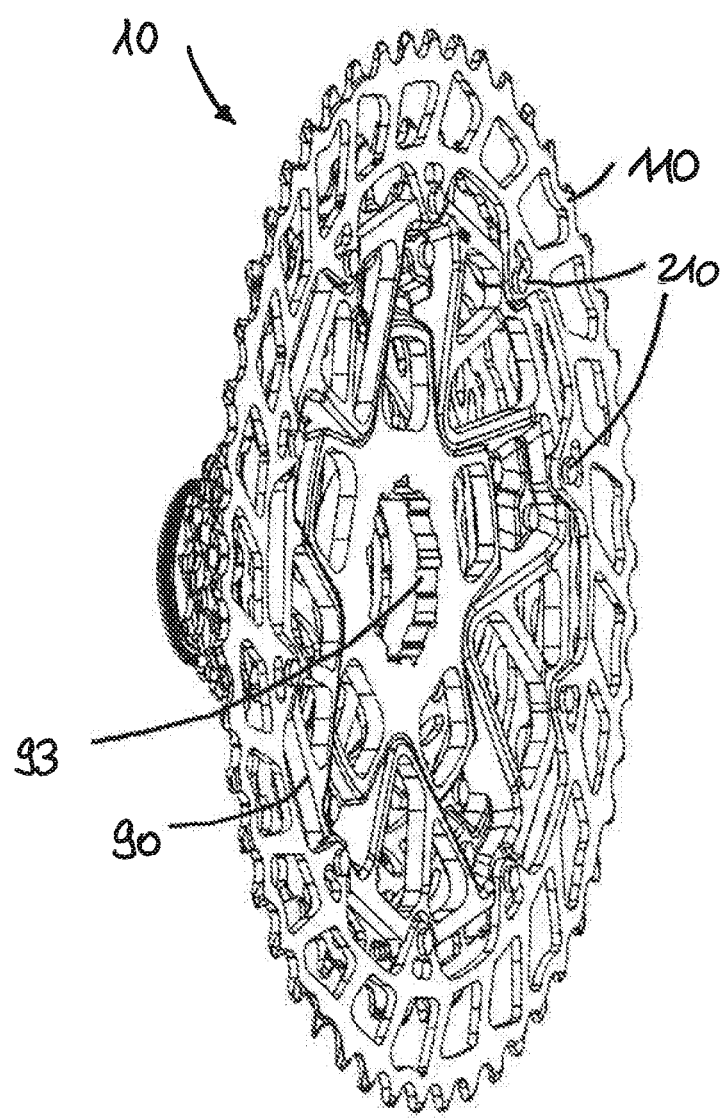
FIG. 3*d* shows a perspective inboard view of the multiple sprocket arrangement.

The sprockets are retained on driver 50 by lock ring 60. Carrier 90, with its profile for transmission of torque 93, is clearly apparent in the perspective inboard view of multiple sprocket arrangement 10 in FIG. 3d.

Figure 4A:
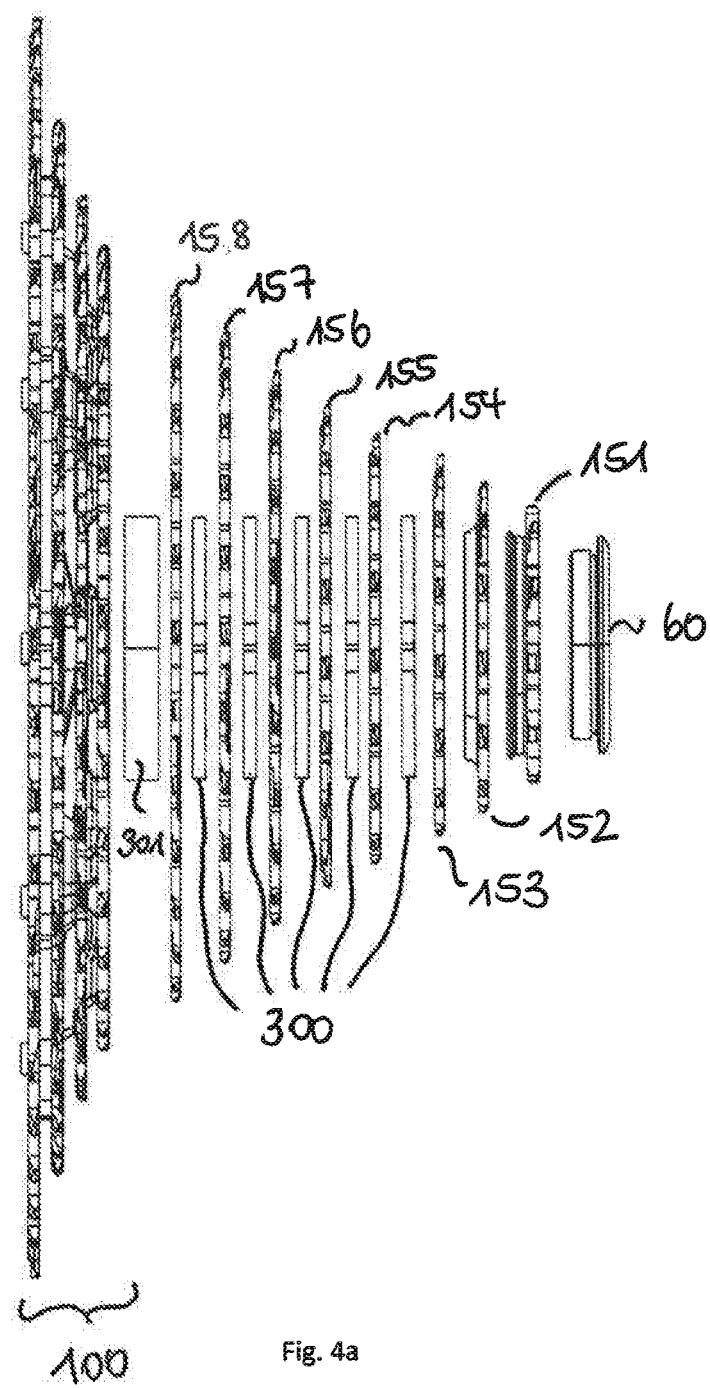
FIG. 4*a* shows a side view of the multiple sprocket arrangement from FIG. 3 with partially pulled apart components.
Figure 4B:
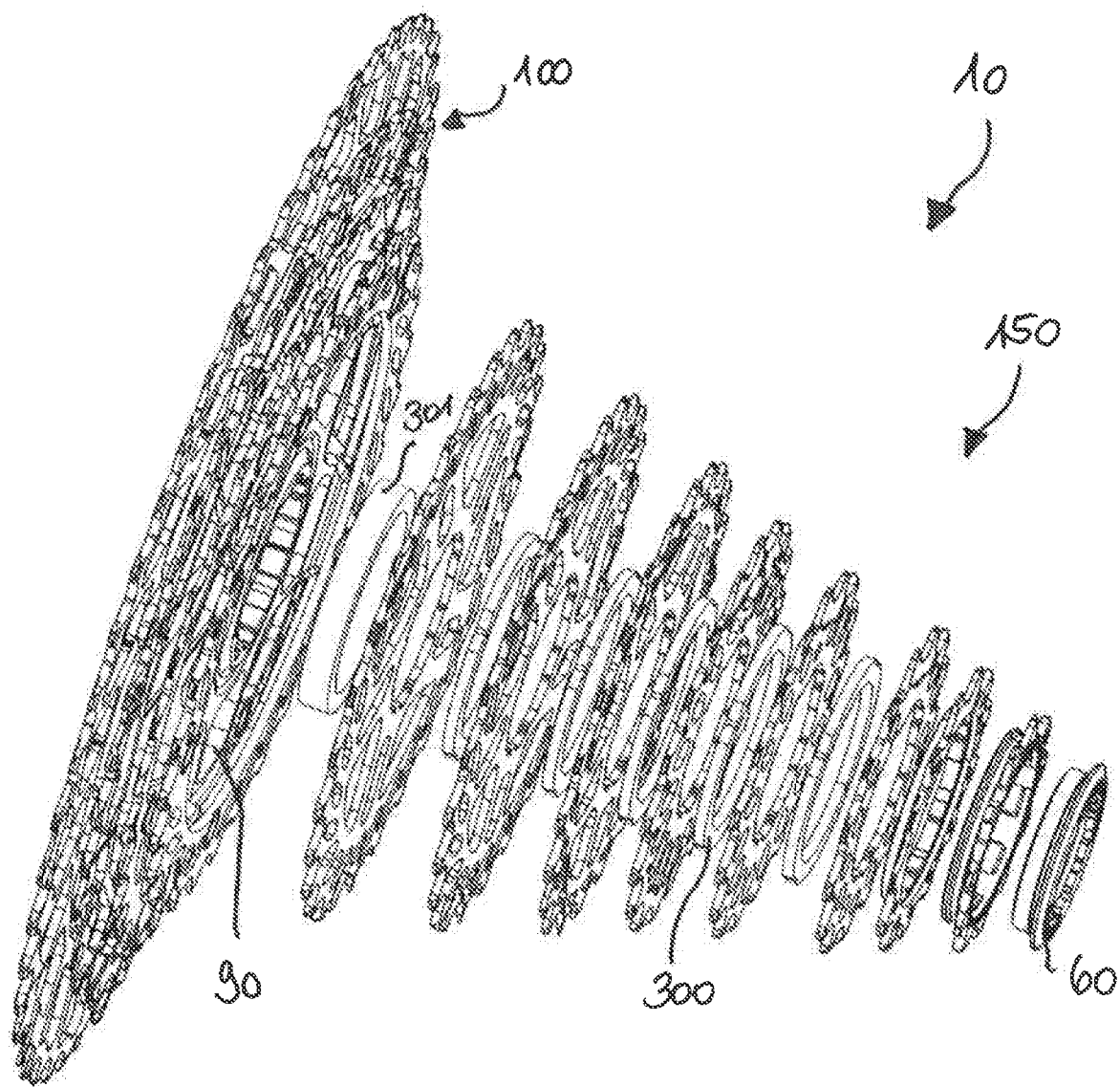
FIG. 4*b* shows a perspective view of the multiple sprocket arrangement from FIG. 4*a*.

FIGS. 4a and 4b show, respectively, an exploded side view and an exploded perspective view of the multiple sprocket arrangement 10 from FIGS. 3a-3d, including sprocket sub-assembly 100 and remaining eight individual sprockets 151 to 158. In the exploded representation, spacers 300 between adjacent sprockets 151 to 158 are visible. Spacer 301, between the fourth largest sprocket 140 and next smallest sprocket 158, is formed to be slightly wider than spacers 300 since the distance between carrier 90 and sprocket 158 is slightly larger than the substantially uniform distance between the respectively adjacent, axially outboard sprockets 151 to 158. Smallest sprockets 152 and 151 each have a circumferential flange portion on their axially inboard sides, which serves as a spacer. The profiles for engagement with the driver are visible in the perspective view of FIG. 4b at the radially inner end of small sprockets 150.

Figure 5A:
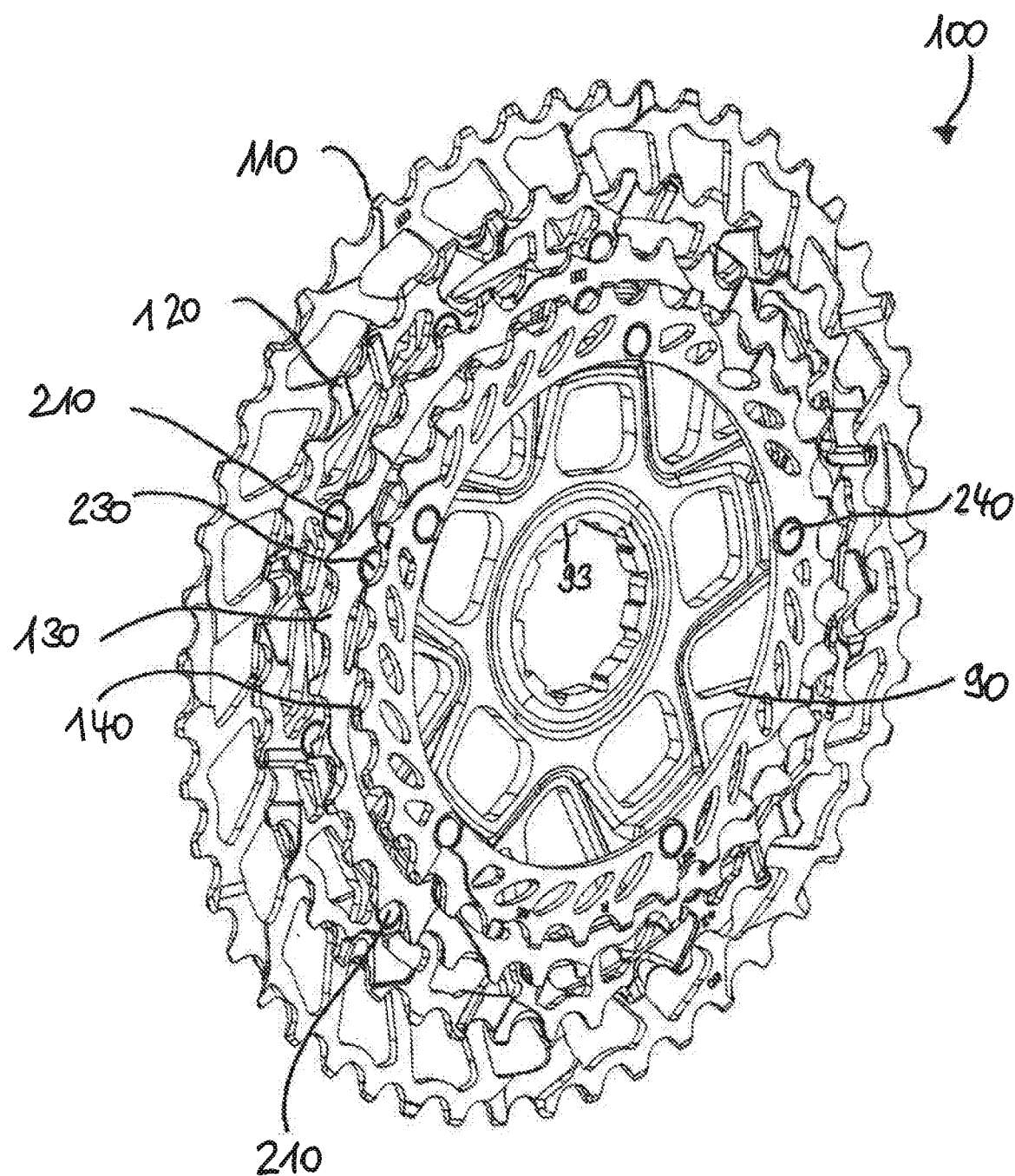
FIG. 5*a* shows a perspective outboard view of the sprocket sub-assembly of the multiple sprocket arrangement from FIG. 3.
Figure 5B:
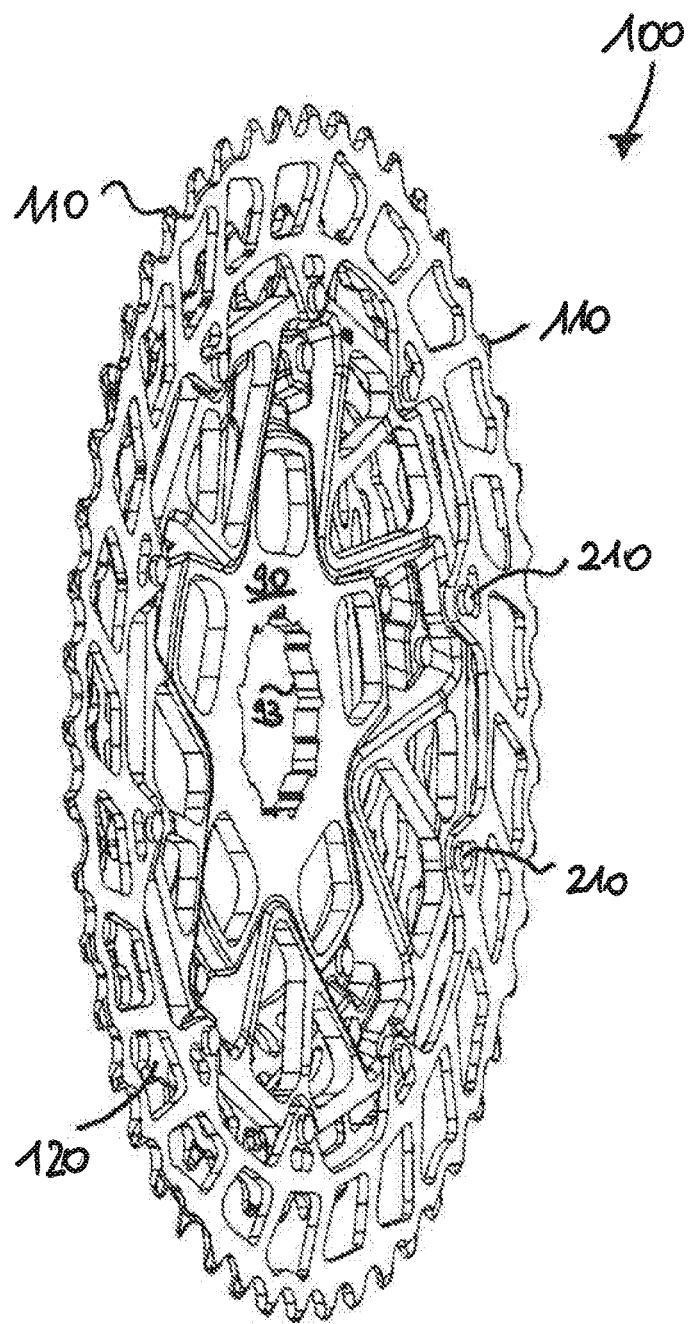
FIG. 5*b* shows a perspective inboard view of the sprocket sub-assembly from FIG. 5*a*.

FIG. 5a shows a perspective outboard view and FIG. 5b shows a perspective inboard view of sprocket sub-assembly 100 of multiple sprocket arrangement 10 from FIGS. 3a-3d. The four largest sprockets 110, 120, 130 and 140 are fastened spaced apart from one another on carrier 90 with profile 93. Fourth largest sprocket 140 is fastened with five rivets 240 axially on the outboard side of carrier 90 on a fourth carrier level. Third largest sprocket 130 is fastened to carrier 90 axially further inward with five rivets 230 on a third carrier level. Second largest sprocket 120 is arranged on the outboard side of carrier 90 axially inward of third largest sprocket 130, and largest sprocket 110 is arranged on the axially inboard side of carrier 90. The two largest sprockets 110, 120 are jointly fastened on carrier 90 by ten rivets 210.

Figure 6A:
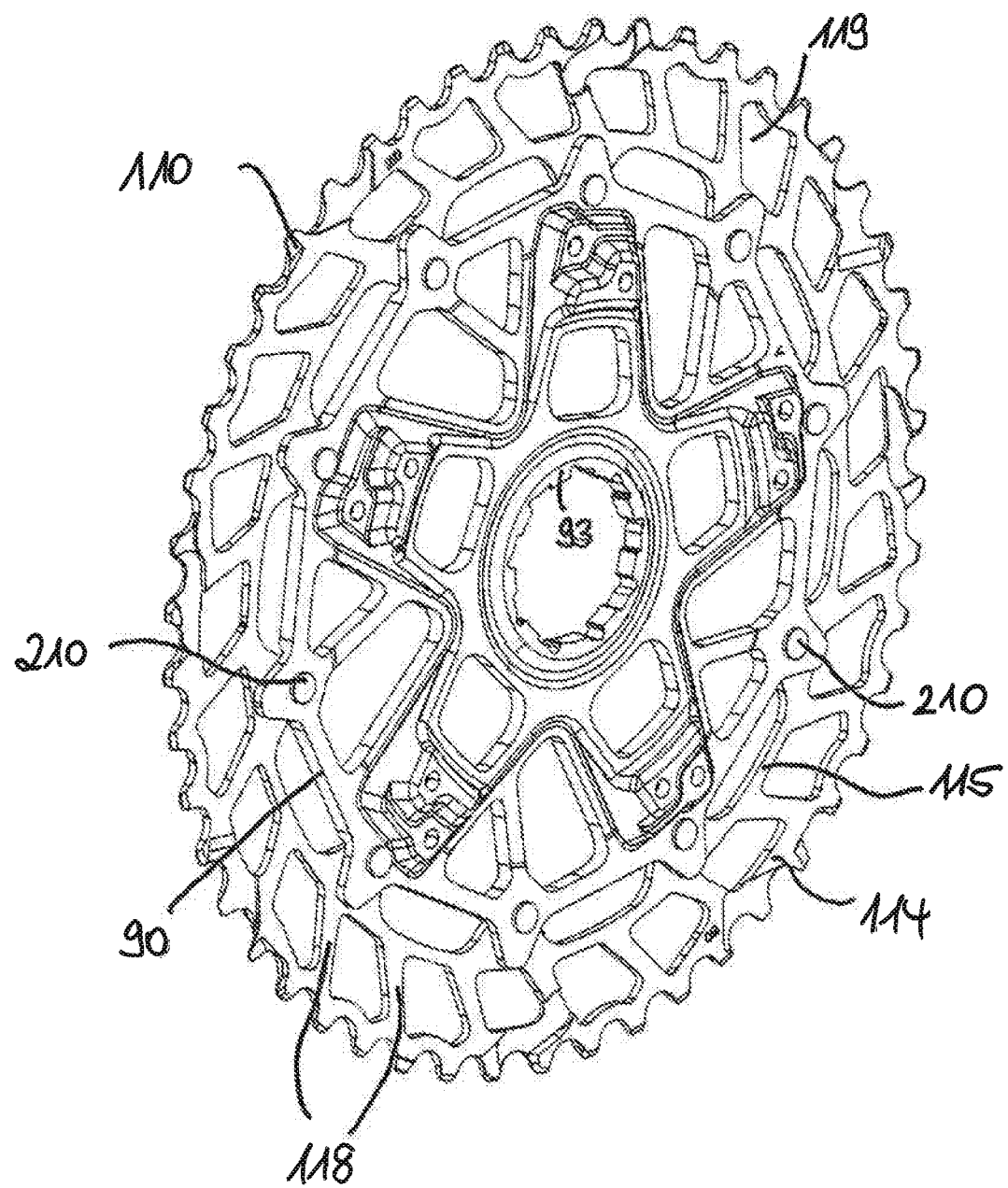
FIG. 6*a* shows a perspective outboard view of the largest sprocket mounted on the sprocket carrier.
Figure 6B:
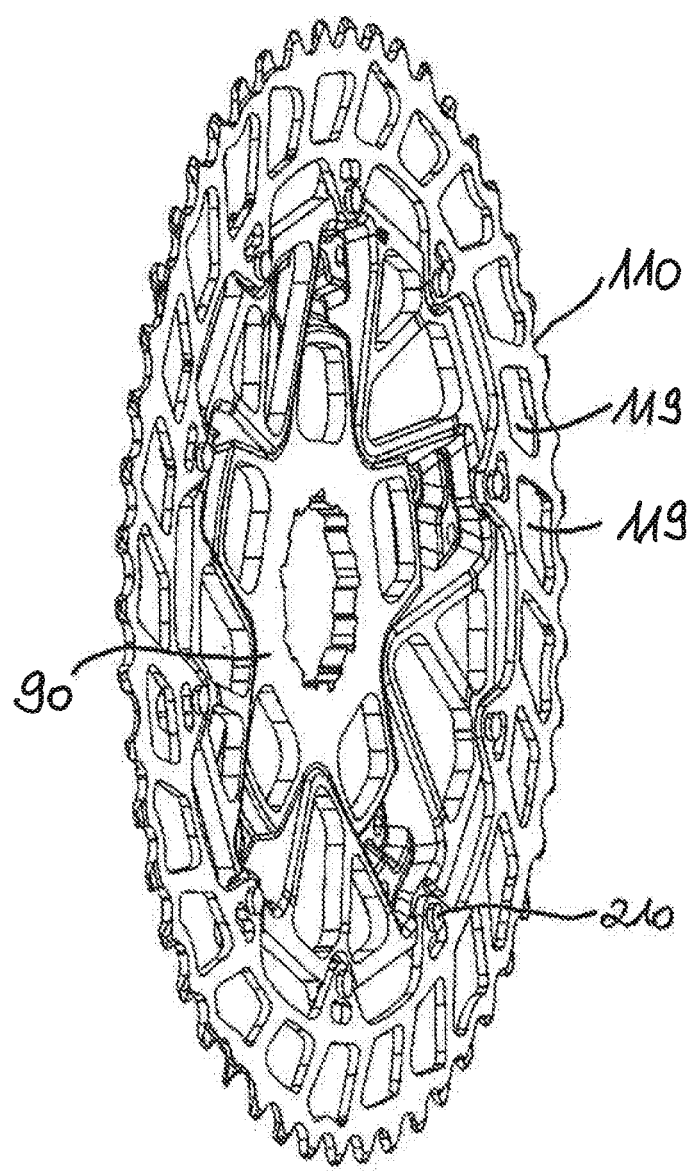
FIG. 6*b* shows a perspective inboard view from FIG. 6*a*.
Figure 7:
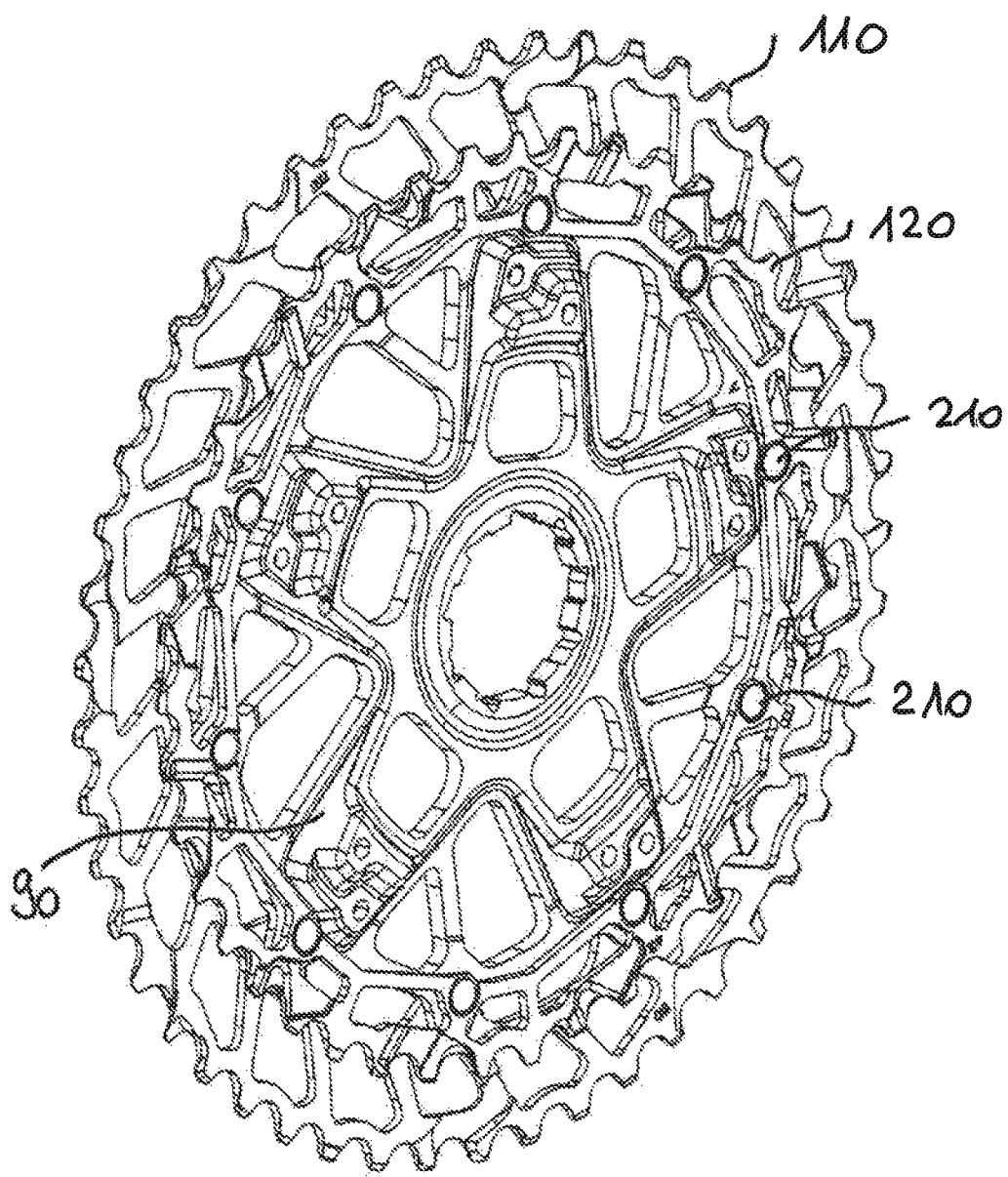
FIG. 7 shows a perspective outboard view of the largest and second largest sprocket mounted on the sprocket carrier.
Figure 8:
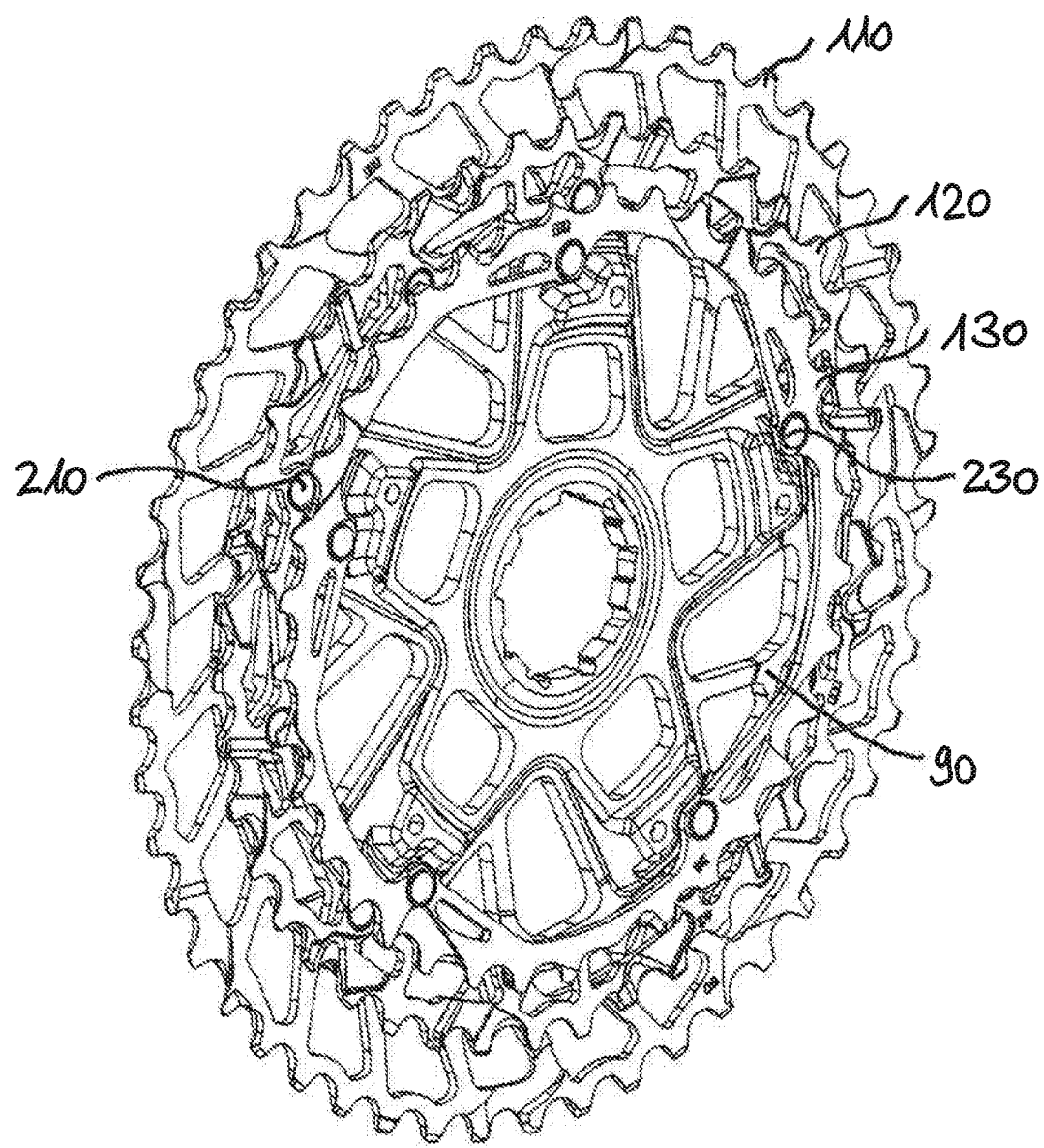
FIG. 8 shows a perspective outboard view of the largest, second largest and third largest sprocket mounted on the sprocket carrier.

FIGS. 6-8 show the sequence in which the four largest sprockets are mounted.

FIG. 6a shows a perspective outboard view and FIG. 6b shows a perspective inboard view of largest sprocket 110 mounted on sprocket carrier 90. Sprocket 110 bears against the inboard side of carrier 90. Sprocket 110 and carrier 90 overlap in the region of each of their respective ten projections. In this overlapping region, sprocket 110 and carrier 90 are riveted to one another by means of ten rivets 210. Largest sprocket 110 is formed annularly with a sprocket outer ring 114 and a sprocket inner ring 115. A plurality of sprocket webs 118 extend between radial sprocket outer ring 114 and sprocket inner ring 115. In order to save weight, a plurality of gaps 119 is provided in annular sprocket 110.

FIG. 7 shows a perspective outboard view of the largest and second largest sprockets 110, 120 mounted on sprocket carrier 90. The two largest sprockets 110, 120 share a total of ten rivets 210, wherein largest sprocket 110 is arranged on the inboard side and second largest sprocket 120 is arranged on the outboard side of carrier 90. The two largest sprockets 110, 120 are spaced apart by the projections of carrier 90 (see FIG. 9f). This arrangement of the two sprockets 110, 120 reduces the number of rivets required and shortens the mounting process. The ten rivets 210 are preferably riveted simultaneously.

FIG. 8 shows a perspective outboard view of the three largest sprockets 110, 120, 130 mounted on sprocket carrier 90. While the two largest sprockets 110, 120 are mounted jointly on the ten radial projections of carrier 90, sprocket 130 is fastened to the five arms 91 of carrier 90 with five rivets 230. Five carrier arms 91 have several steps on different levels wherein third largest sprocket 130 is fastened on the third level or the third step. The five rivets 230 are also preferably riveted simultaneously in one mounting step. The same configuration applies to fourth largest sprocket 140, which has already been described with fully mounted sub-assembly 100 in FIGS. 5a and 5b.

Of particular note is the fastening of at least one first large sprocket 110 and a third large sprocket 130 to a sprocket carrier 90, wherein sprockets 110, 130 have teeth 113, 133 on their outer peripheries. In this embodiment, smaller sprocket 130 is fastened to a first number of carrier arms 91 of sprocket carrier 90 and the tension introduced by the chain tensile force of a chain engaging on teeth 113 of sprocket 110 is passed on via carrier arms 91 to the profile for the transmission of torque 93 at the inner periphery of sprocket carrier 90. Further, the larger of these two sprockets 110, 130 is fastened to a second number of carrier projections 98 via rivet receiving holes 99.1 on the outer periphery of sprocket carrier 90, this number being larger than the first number. The tensions introduced by the chain tensile force of a chain engaging on teeth 113 of sprocket 110 is passed on to a profile for the transmission of torque 93 on the inner periphery of sprocket carrier 90. Sprocket carrier 90, with carrier arms 91, behaves here like a circular disc. Gaps 94 serve the purpose of reducing weight. The impressions on inboard side 90b of sprocket carrier 90 form at least one carrier step 92.3 in order to improve stability.

FIGS. 9a-9f show various views of sprocket carrier 90 which is formed as a low-cost, stamped/formed part with a substantially uniform wall thickness d2. Material thickness d2 must be dimensioned to be sufficiently stable to withstand axially acting forces.

Figure 9A:
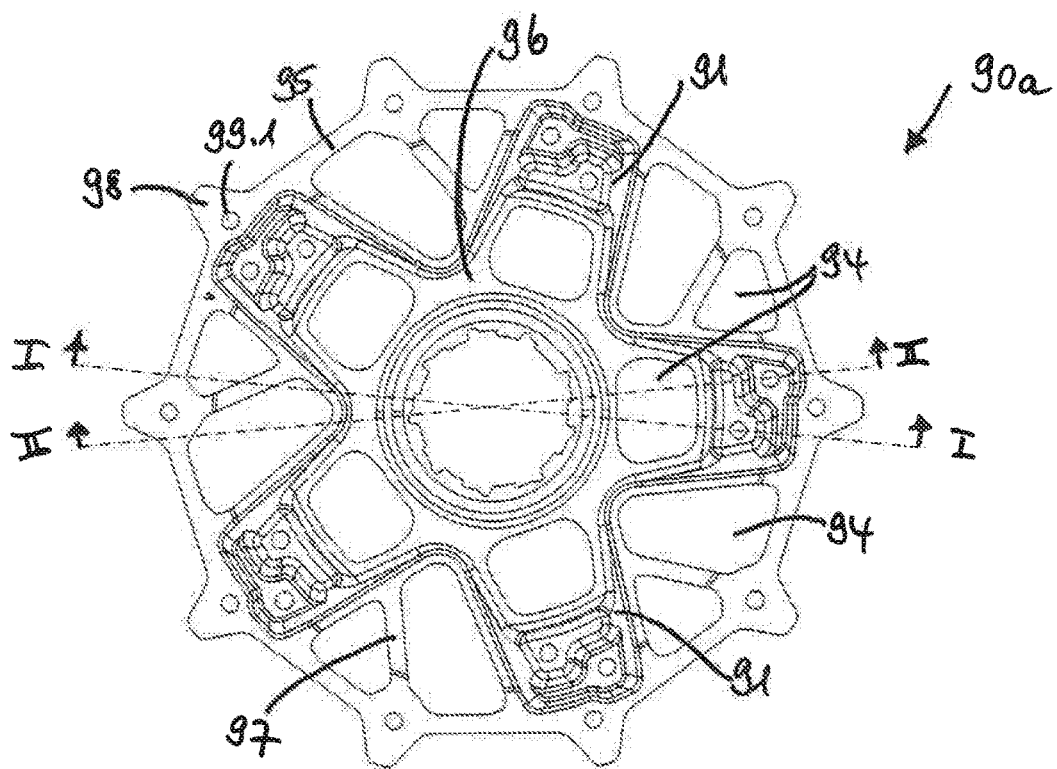
FIG. 9*a* shows an outboard view of the sprocket carrier.
Figure 9B:
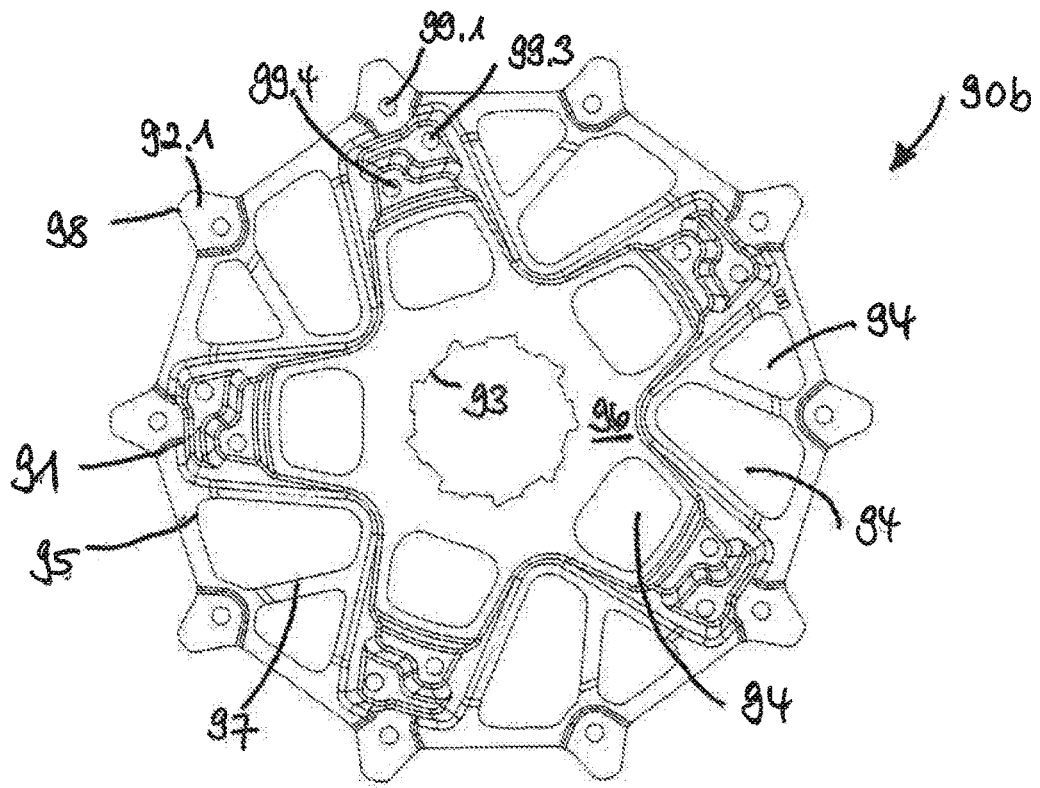
FIG. 9*b* shows an inboard view of the sprocket carrier.

FIG. 9a shows outboard side 90a of sprocket carrier 90 and FIG. 9b shows inboard side 90b of sprocket carrier 90. At its radially inner end, carrier 90 has a profile for the transmission of torque 93. An inner ring 96 is located adjacent thereto. Five carrier arms 91 extend radially outwards from profile 93. Carrier arms 91 are connected at their radially outer ends by an outer ring 95. Ten carrier projections 98 extend radially outwards from outer ring 95. Every second carrier projection 98 is arranged in the region of a carrier arm 91. The other five carrier projections 98 are arranged in each case between two adjacent carrier arms 91. Five carrier webs 97 extend from these five carrier projections 98 in gaps 94 between carrier arms 91 in the direction of the circumferentially next carrier arm 91. The plurality of material gaps 94 along carrier arms 91 and between adjacent carrier arms 91 reduces the weight of carrier 90.

Carrier projections 98 include impressions on inboard side 90b of carrier 90 that form first carrier step 92.1 for attachment of largest sprocket 110. The opposite, outboard side 90a of carrier 90 in the regions of projections 98 forms second carrier step 92.2 for attachment of second sprocket 120. First and second sprocket 110, 120 are fastened by means of rivets 210 through rivet receiving holes 99.1. Further rivet receiving holes 99.3 and 99.4 are located on third and fourth carrier steps 92.3 and 92.4, respectively. Rivet receiving holes 99.1, 99.3 and 99.4 assigned to the same carrier arm 91 are arranged offset from one another in the circumferential direction. They may not lie on a line in the radial direction, rather may be arranged offset thereto.

Figure 9C:
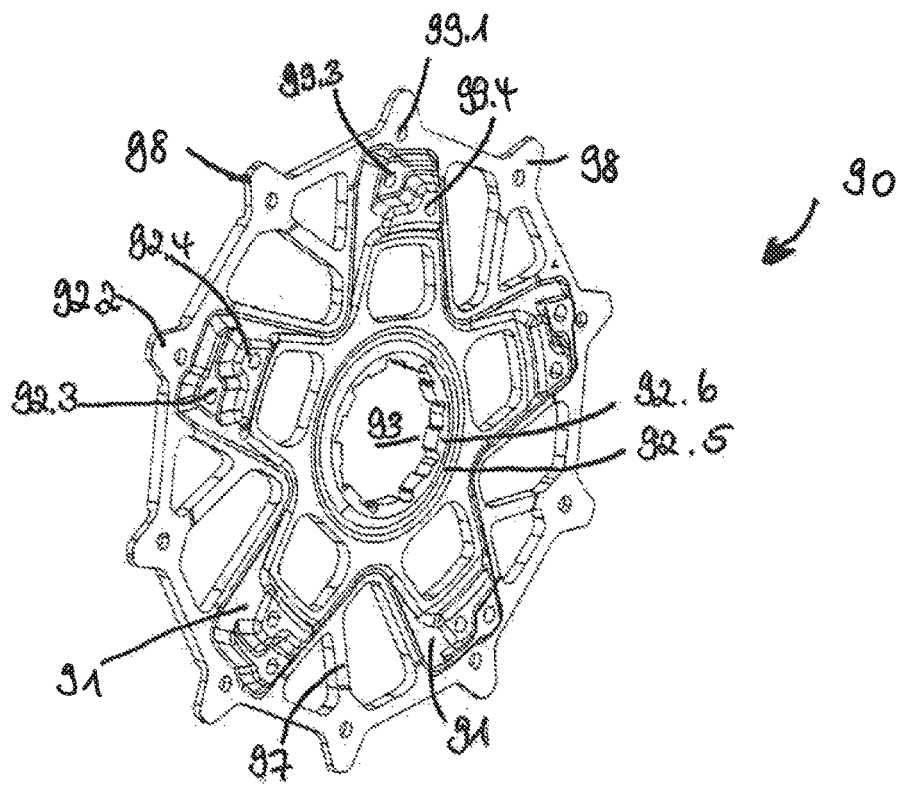
FIG. 9*c* shows a perspective outboard view of the sprocket carrier.
Figure 9D:
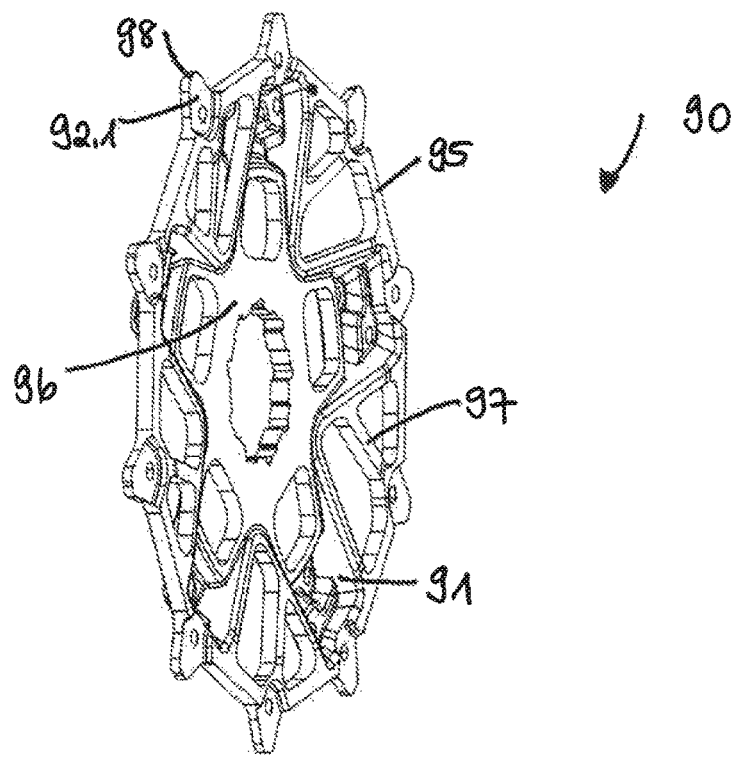
FIG. 9*d* shows a perspective inboard view of the sprocket carrier.

FIGS. 9c and 9d show a perspective outboard view and a perspective inboard view of sprocket carrier 90, respectively. The steps, generated by deforming the originally flat sheet with a material thickness d2, and different levels are best visible in the perspective views of FIGS. 9c and 9d and in the sectional views of FIGS. 9e and 9f. Material thickness d2 of carrier 90 is indeed also substantially uniform after deforming, but axial total height d4 of carrier 90 has at least doubled, in particular tripled or quadrupled from original thickness d2.

As a result of the formation of carrier steps 92.1, 92.2, 92.3 and 92.4, four sprockets 110-140 can be mounted directly on sprocket carrier 90. The different levels of the steps define the distances between the sprockets without further components, such as distance sleeves, being required. The different impressions and other deformations that form carrier steps 92 along carrier arms 91 produce the required stability of carrier 90.

Figure 9E:
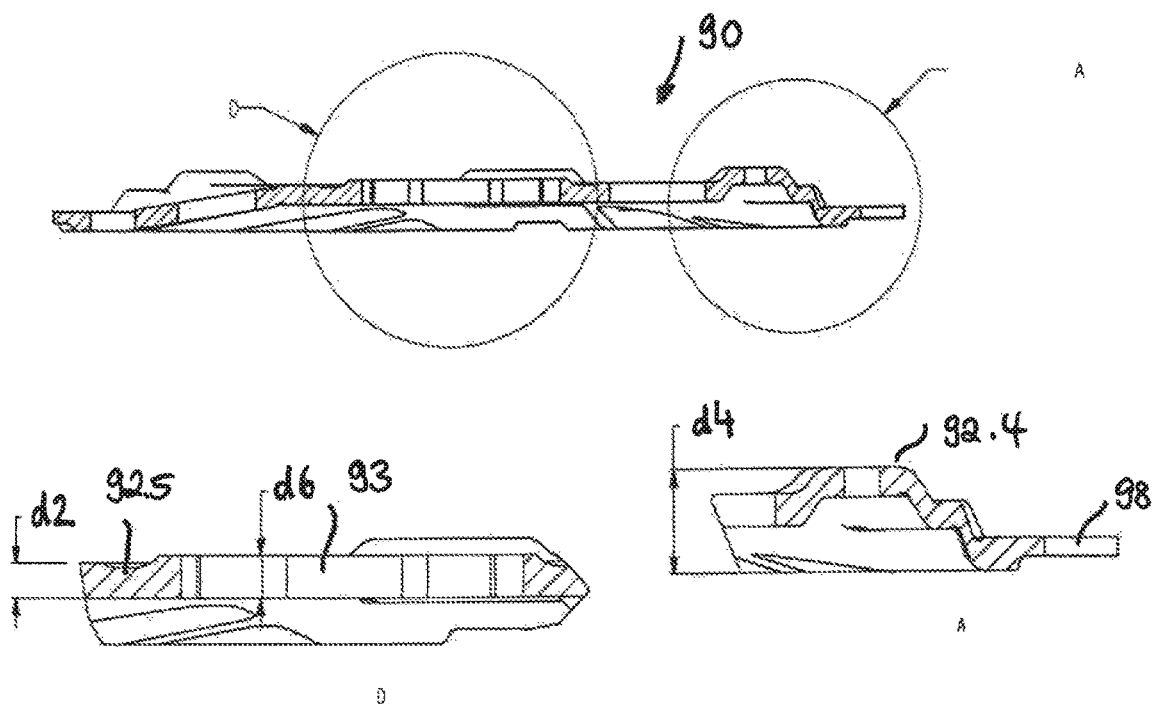
FIG. 9*e* shows a sectional view I-I according to FIG. 9*a* and enlarged detailed views of FIGS. 9*e*2 and 9*e*2 of the sprocket carrier.

FIG. 9e shows sectional view I-I according to FIG. 9a and enlarged detailed views, FIGS. 9e1 and 9e2, of sprocket carrier 90 in an embodiment. In the embodiment shown, original material thickness d2 is dimensioned to be approximately 3 mm. As a result of impression 92.5 on outboard side 90a of carrier 90 in the region of inner ring 96 and the associated material displacement, material thickness d6 may be slightly increased in the region of the profile for the transmission of torque 93 to a dimension of approximately 4 mm (see FIG. 9e2). FIG. 9e1 shows the significantly increased axial total height d4 of carrier 90, approximately 11 mm measured from the axial inboard side of carrier 90 up to the level of fourth carrier step 92.4. Fourth largest sprocket 140 is fastened onto the fourth carrier step 92.4. Carrier projections 98 include impressions on the axially inboard side.

Figure 9F:
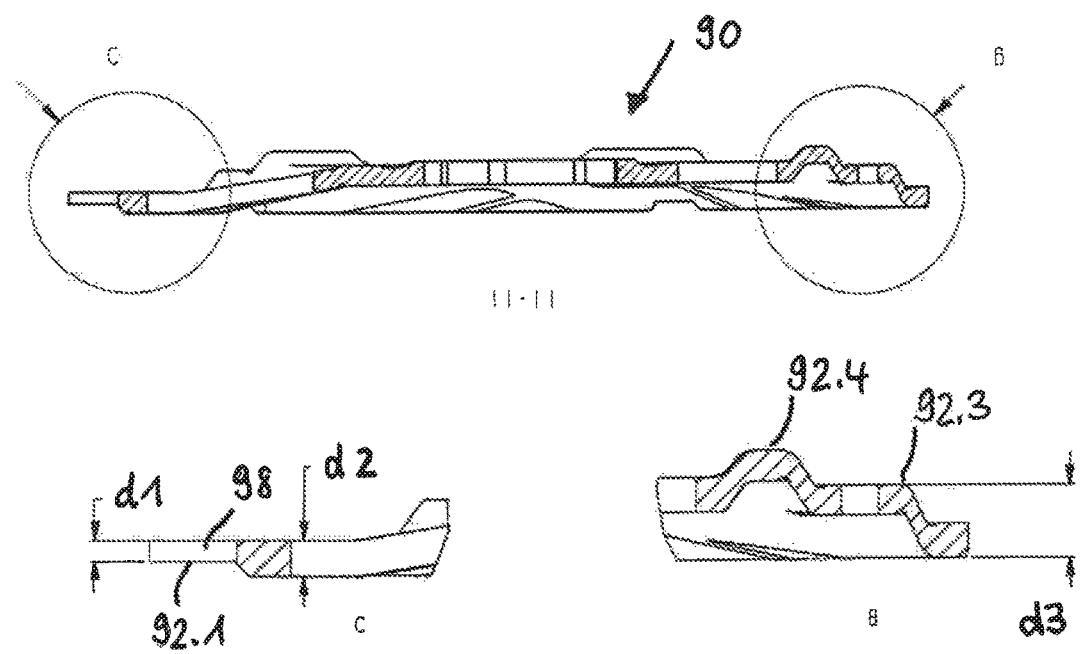
FIG. 9*f* shows a sectional view II-II according to FIG. 9*a* and enlarged detailed views of FIGS. 9*f*1 and 9*f*2 of the sprocket carrier.

FIG. 9f shows sectional view II-II according to FIG. 9a and enlarged detailed views, FIGS. 9f1 and 9f2, of sprocket carrier 90 in an embodiment.

FIG. 9f$_2$ shows a carrier projection 98 having material thickness d1, which is slightly reduced in comparison with original material thickness d2 as a result of the impressions on the axially inboard side. First carrier step 92.1, on which largest sprocket 110 is arranged, is produced by the impression on the axially inboard side of projection 98. On the opposite, axially outboard side of projection 98, second largest sprocket 120 is arranged on second carrier step 92.2. FIG. 9f$_1$ shows third carrier step 92.3, with a height d3 of approximately 7 mm for fastening third largest sprocket 130, and fourth carrier step 92.4 which lies above it.

Carrier 90 has a substantially uniform, relatively thin material thickness d1, d2, d6. For example, this thickness may be approximately 2 mm to 4 mm in an embodiment. The relatively thin material thickness leads to a low weight. At the same time, various carrier steps and levels are generated in the stamp/bending method by deforming the metal. This deformation leads to high stability of carrier 90 and a significantly increased axial total height d3, d4 in comparison with the material thickness. In contrast, conventional sprocket carriers are formed to be more solid and heavier.

Figure 10A:
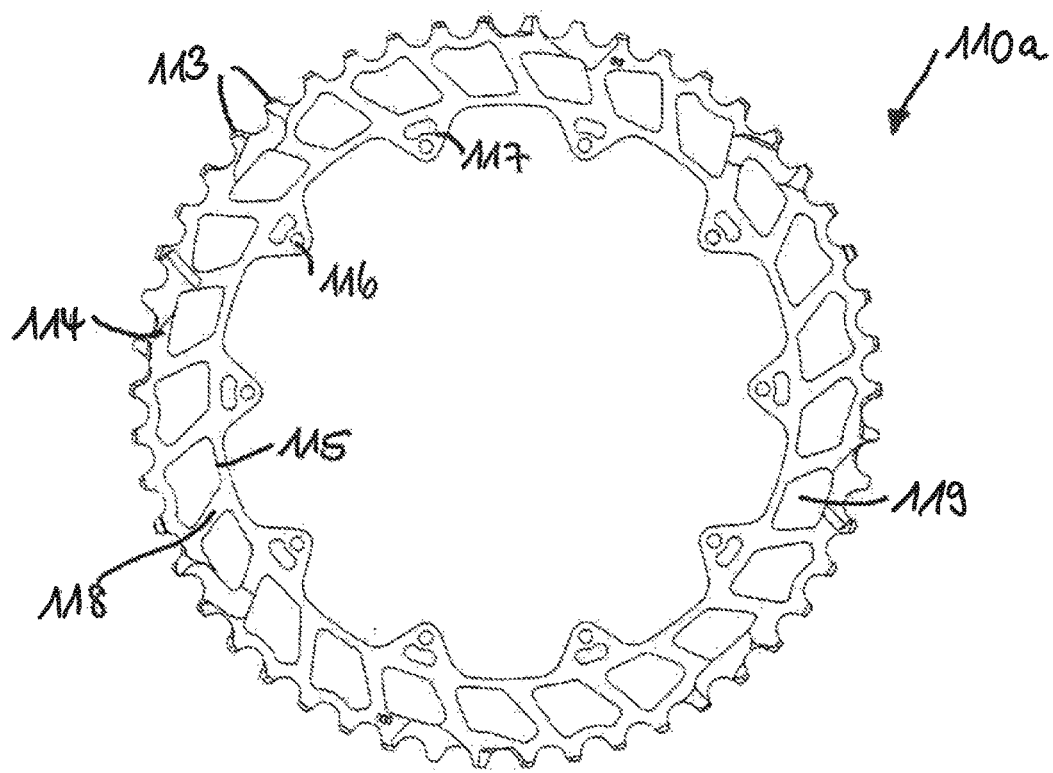
FIG. 10*a* shows an outboard view of the largest sprocket.
Figure 10B:
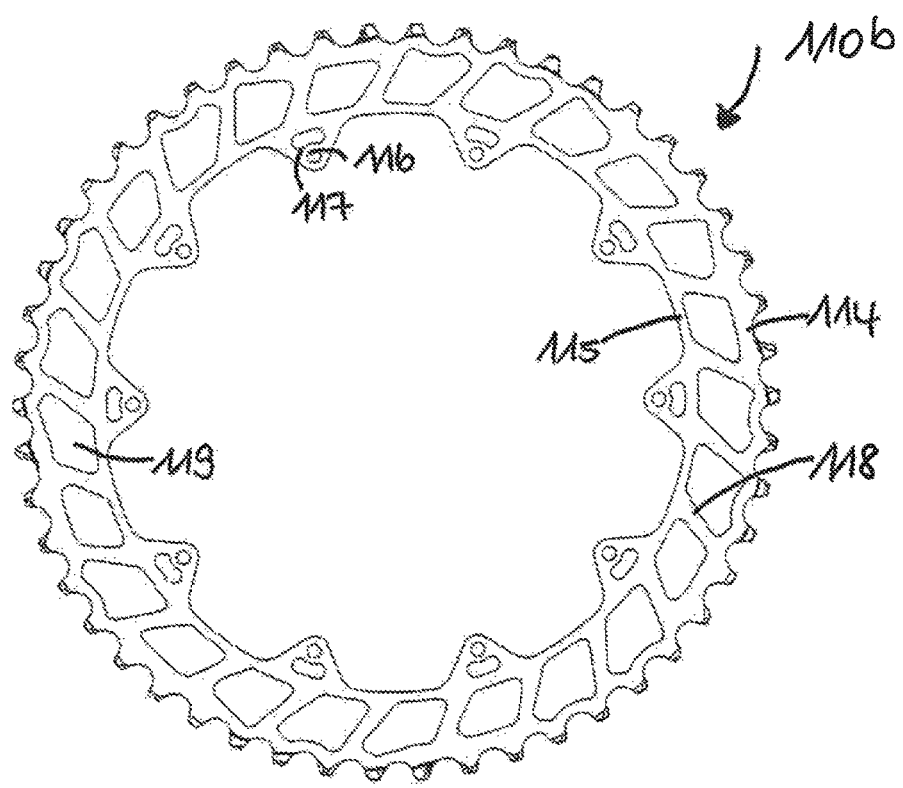
FIG. 10*b* shows an inboard view of the largest sprocket.

FIGS. 10a and 10b show axially outboard side 110a and axially inboard side 110b of largest, annular sprocket 110. The sprocket has, on its radially outer circumference, a sprocket outer ring 114 with a total of 50 teeth 113. A sprocket inner ring 115 is formed on its radially inner circumference. A plurality of sprocket webs 118 extend between sprocket outer and inner rings 114, 115. Sprocket webs 118 run, as seen in the outboard view in FIG. 10a, obliquely forwards from sprocket outer ring 114 to sprocket inner ring 115. In other words, as seen in direction of rotation D, the radially inner end of sprocket web 118 lies further forward than the radially outer end of sprocket web 118. As a result of this alignment, webs 118 act like compression members and can absorb forces and tensions which are transmitted from chain 20 to sprocket 110 and pass them on radially inwards in the direction of the carrier. Gaps 119 are arranged between webs 118. At the radially inner end of sprocket 110, ten sprocket projections 117, each with one rivet receiving hole 116, extend radially inwards from inner ring 115. Rivets 210 for fastening largest sprocket 110 to carrier 90 are guided through these rivet receiving holes 116.

Every fifth one of the plurality of sprocket webs 118 of sprocket 110 runs on approximately the same line as the five webs 97 of carrier 90. Webs 97 of carrier 90 serve as an extension or elongation of sprocket webs 118. Chain tensile forces, which are introduced radially from the outside into largest sprocket 110, are passed on initially via sprocket webs 118 and subsequently directly via the five carrier arms 91 and/or indirectly via the five carrier webs 97 into the five carrier arms 91 in the direction of carrier profile 93 (see FIG. 6a).

Figure 11A:
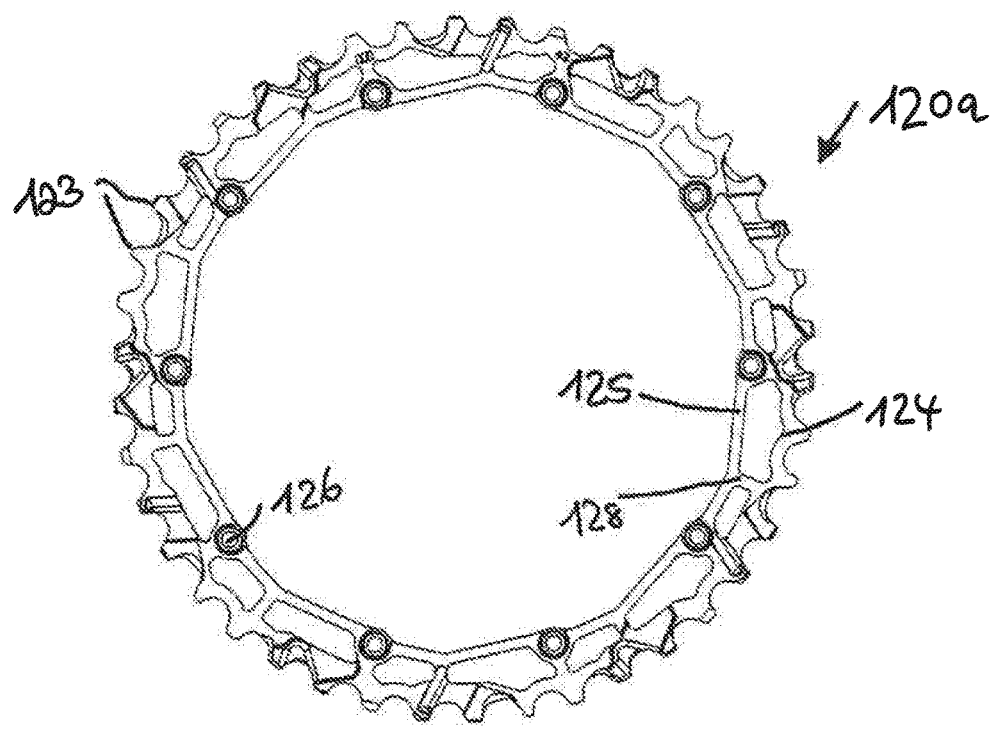
FIG. 11*a* shows an outboard view of the second largest sprocket.
Figure 11B:
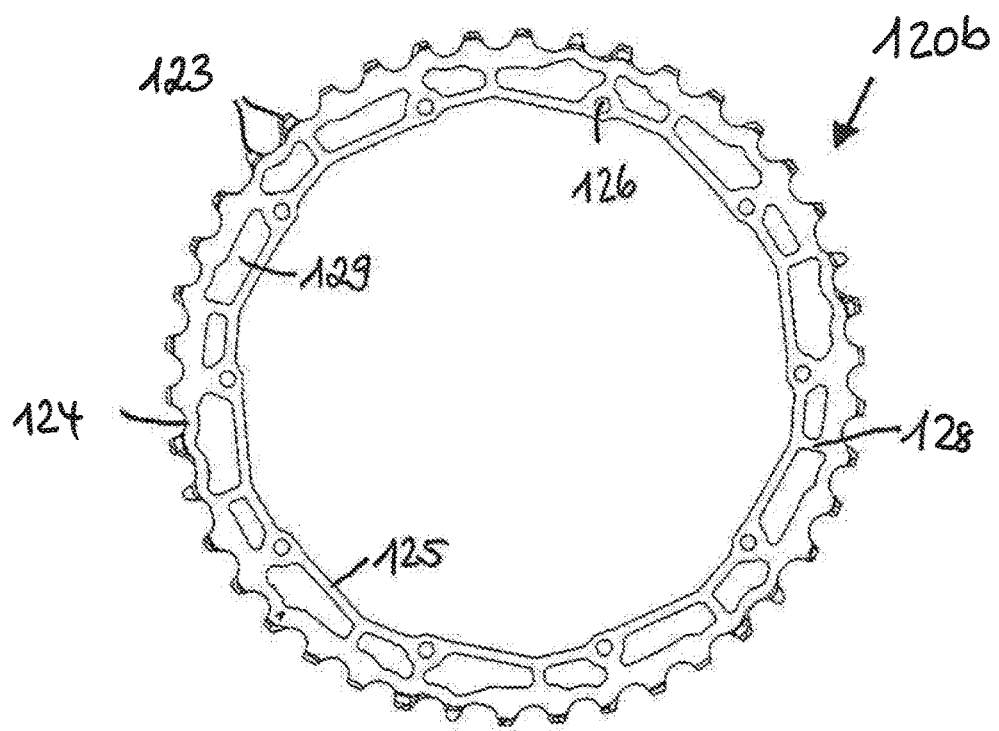
FIG. 11*b* shows an inboard view of the second largest sprocket.

FIG. 11a shows an axially outboard side 120a of second largest sprocket 120, with a total of 42 teeth 123. FIG. 11b shows an axially inboard side 120b of sprocket 120, with 10 rivet receiving holes 126. It behaves in a similar manner to sprocket 110 with the chain tensile forces which are introduced into second largest sprocket 120. At second largest sprocket 120, the forces are also conducted from sprocket outer ring 124 via sprocket webs 128 to sprocket inner ring 125 and transmitted to carrier 90. Every second one of the 10 sprocket projections 117 with rivet receiving holes 116 of largest sprocket 110 lies in the region of a carrier arm 91. The other five sprocket projections 117 of largest sprocket 110 lie in the region of the radially outer ends of carrier webs 97, which lie in the regions between each carrier arm 91. This arrangement ensures as stable a connection as possible (see FIG. 6a). This configuration correspondingly applies to the rivet connections between second largest sprocket 120 and carrier 90 (see FIG. 7).

Figure 12A:
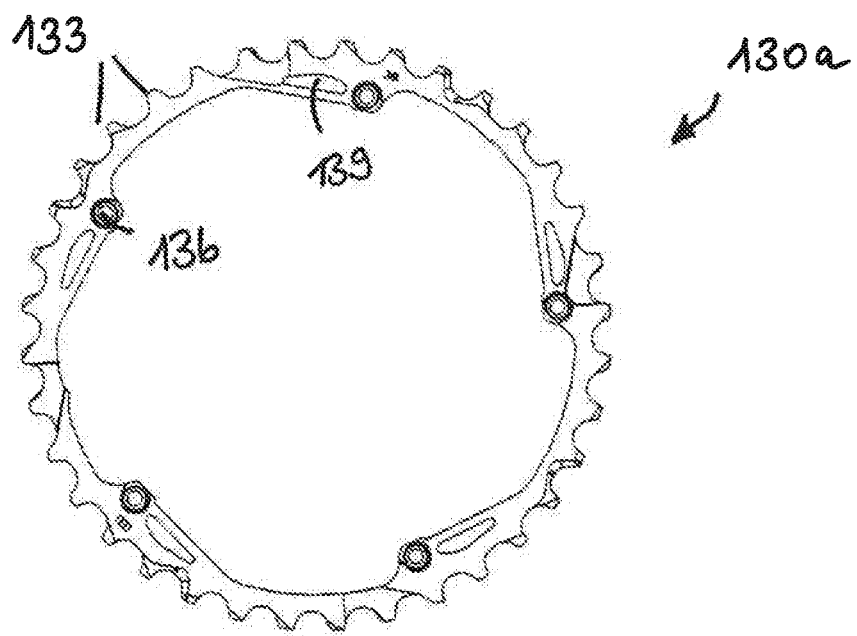
FIG. 12*a* shows an outboard view of the third largest sprocket.
Figure 12B:
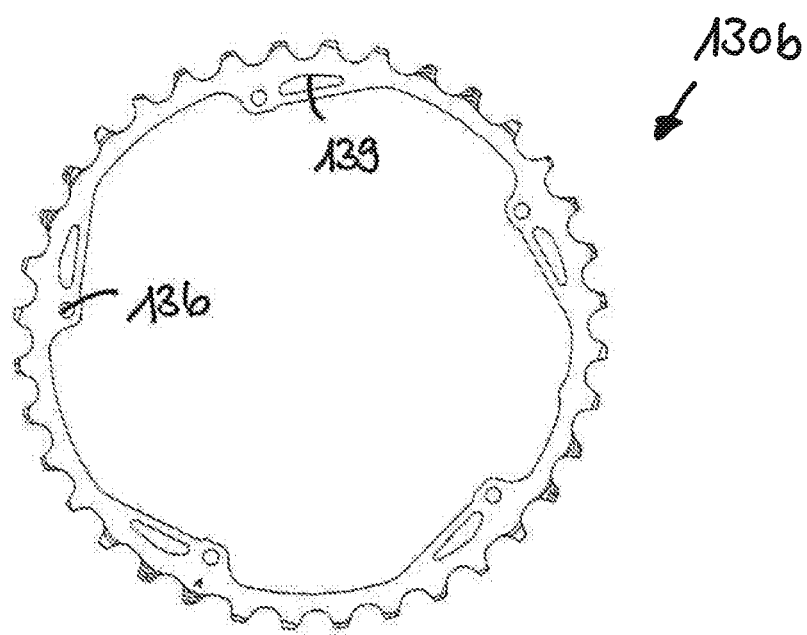
FIG. 12*b* shows an inboard view of the third largest sprocket.

FIGS. 12a and 12b show an axially outboard view 130a and an axially inboard view 130b of third largest sprocket 130 with gaps 139 and a total of 36 teeth 133.

Figure 13A:
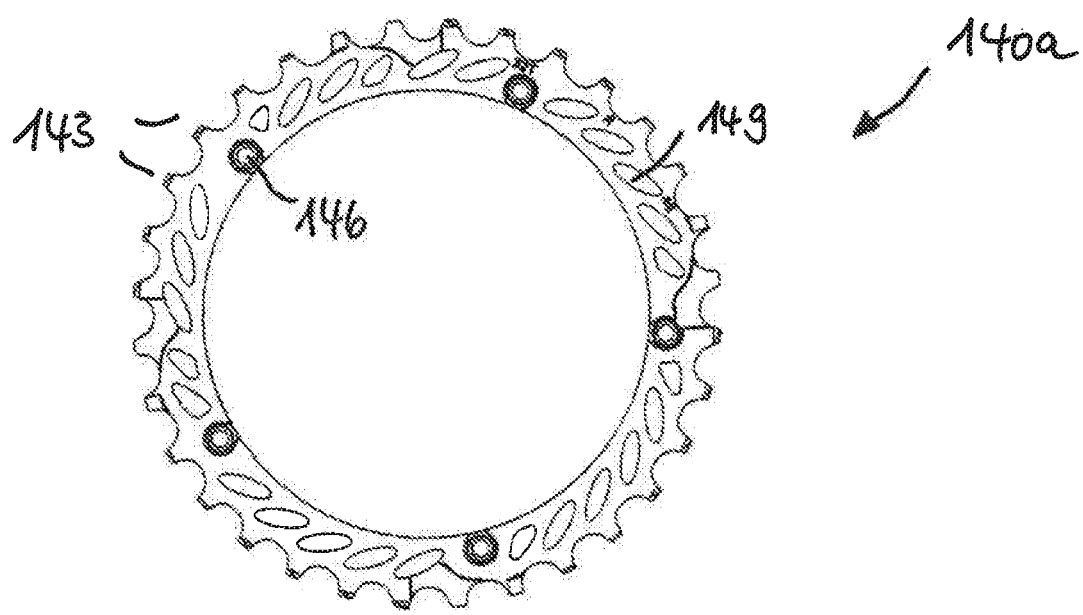
FIG. 13*a* shows an outboard view of the fourth largest sprocket.
Figure 13B:
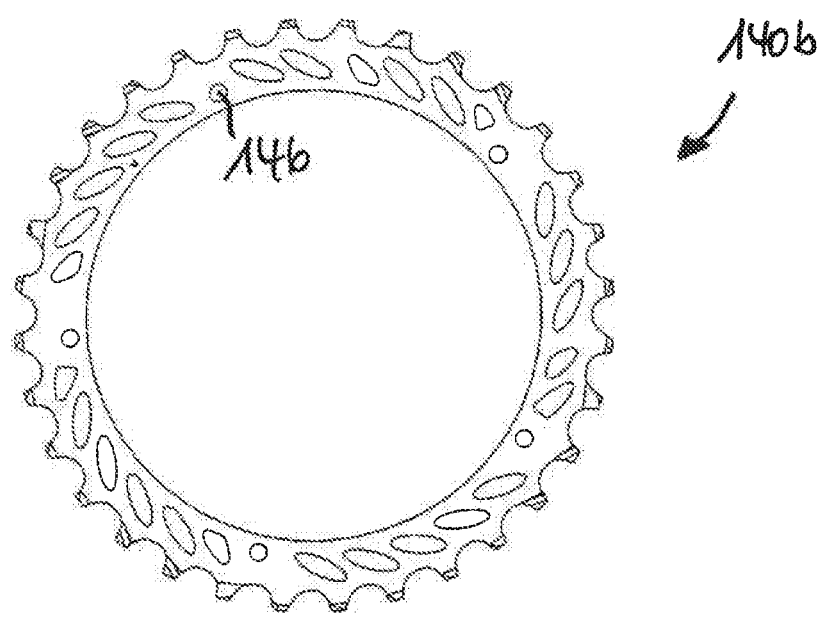
FIG. 13*b* shows an inboard view of the fourth largest sprocket.

FIGS. 13a and 13b correspondingly show axially outboard side 140a and axially inboard side 140b of fourth largest sprocket 140 with a plurality of gaps 149 and a total of 32 teeth 143.

Third largest and fourth largest sprocket 130, 140 each only have five rivet receiving holes 136, 146. On the axially outboard sides of sprockets 130, 140, each of the rivet receiving holes 136, 146 has a depression in which the rivet heads are partially received so that they do not collide with the chain 20 in the axial direction.

The sprockets could optionally also be formed to be solid, i.e. without the gaps. This would lead to even more stability, but also more weight. The sprockets may be conventional stamped parts composed of (hardened) steel. This enables particularly low-cost production. Other materials such as aluminium, or other production methods such as milling, are, also possible. Further known details of the sprockets, such as different tooth shapes, tooth thicknesses and shifting gates, are possible.

In an embodiment, a sprocket carrier for a multiple sprocket arrangement for rotatable mounting on a rear wheel axle is provided. The sprocket carrier has a substantially uniform material thickness. Also, the sprocket carrier is formed so that at least three large sprockets can be fastened to it. The sprocket carrier may also have, at a radially inner end, a profile for the transmission of torque and, adjacent thereto in the radial direction, an inner ring.

The sprocket carrier may also have a multiplicity of carrier arms which are connected at a radially outer end of the carrier by an outer ring. The sprocket carrier arms may extend between the inner ring and the outer ring in the radial direction. The sprocket carrier may have, at the radially outer end or along the outer ring, a multiplicity of carrier projections which extend radially to the outside. The sprocket carrier may have a multiplicity of webs for support which extend between the outer ring and the inner ring.

In an embodiment, a sprocket sub-assembly of a multiple sprocket arrangement for rotatable mounting on a rear wheel axle and engagement with a bicycle chain is provided. The sprocket sub-assembly includes a sprocket carrier that has a substantially uniform material thickness. The sprocket carrier is configured such that at least three large sprockets of the multiple sprocket arrangement with different numbers of teeth can be fastened to the sprocket carrier. The sprocket carrier may also include first carrier steps for attachment of a largest sprocket on an axial inboard side of the carrier projections.

The sprocket carrier may also include second carrier steps for attachment of a second largest sprocket on an axial outboard side of the carrier projections. The sprocket carrier may also include third carrier steps for attachment of a third largest sprocket on an axial outboard side of the carrier in the region of the radially outer ends of the carrier arms. The sprocket sub-assembly may include a fourth sprocket, and the sprocket carrier has fourth carrier steps for attachment of the fourth largest sprocket on the axial outboard side of the carrier in the region of the radially outer ends of the carrier arms. The sprocket carrier steps may lie on respectively different levels in the axial direction. The carrier steps may each have a rivet receiving hole arranged offset to one another in the circumferential direction. The largest sprocket may have, along its radially outer circumference, a sprocket outer ring with a multiplicity of teeth and, on its radially inner end, a sprocket inner ring. A multiplicity of sprocket webs may extend from the sprocket outer ring to the sprocket inner ring. A multiplicity of sprocket projections, each having one rivet receiving hole, may extend radially inwards along the sprocket inner ring.

In an embodiment, a multiple sprocket arrangement for rotatable mounting on a rear wheel axle and for engagement in a bicycle chain is provided. The multiple sprocket arrangement includes a sprocket carrier having a substantially uniform material thickness, the sprocket carrier including a sprocket sub-assembly for engagement in a bicycle chain. At least three large sprockets with different numbers of teeth can be fastened to the sprocket carrier. The sprocket sub-assembly includes a multiplicity of further sprockets. The multiple sprocket arrangement also may include a total of at least eleven sprockets, for example twelve or thirteen sprockets. The largest sprocket may have at least 48 teeth. For example, the largest sprocket may have 50 or 51 teeth. In an embodiment, smallest sprocket has at most eleven teeth, for example ten or nine teeth.

While the present invention has been described above by reference to various embodiments, it should be understood that many changes and modifications can be made to the described embodiments. It is therefore intended that the foregoing description be regarded as illustrative rather than limiting, and that it be understood that all equivalents and/or combinations of embodiments are intended to be included in this description.

The invention claimed is:

1. A multiple sprocket arrangement for rotatable mounting on a rear wheel axle and for engagement in a bicycle chain, comprising:
   a number of sprockets including smaller sprockets and larger sprockets
   a sprocket carrier having a substantially uniform material thickness, and a multiplicity of carrier arms which are connected to and extend between an inner ring and an outer ring in a radial direction,
   wherein the carrier arms have carrier steps formed therein configured for attachment of at least two of the larger sprockets.

2. The multiple sprocket arrangement of claim 1, wherein the inner ring includes torque transmitting profile.

3. The multiple sprocket arrangement of claim 2, wherein at least some of the smaller sprockets include the torque transmitting profile.

4. The multiple sprocket arrangement of claim 1, wherein the sprocket carrier further comprises carrier projections configured for attachment to at least a third larger sprocket.

5. The multiple sprocket arrangement of claim 4, wherein the carrier projections are formed at the outer ring.

6. The multiple sprocket arrangement of claim 4, wherein the carrier projections include a receiving hole for the third larger sprocket.

7. The multiple sprocket arrangement of claim 5, wherein a largest sprocket of the larger sprockets is attached at the receiving hole.

8. The multiple sprocket arrangement of claim 1, wherein the sprocket carrier comprises material gaps the along carrier arms.

9. The multiple sprocket arrangement of claim 1, wherein the sprocket carrier comprises material gaps between adjacent carrier arms.

10. The multiple sprocket arrangement of claim 1, wherein the carrier steps include receiving holes for the at least two larger sprockets.

11. The multiple sprocket arrangement of claim 10, wherein the at least two larger sprockets are attached to the receiving holes with rivets.

12. The multiple sprocket arrangement of claim 10, wherein multiple receiving holes formed in arms of the multiplicity of carrier arms are arranged offset from one another in the circumferential direction.

13. The multiple sprocket arrangement of claim 12, wherein the multiple receiving holes are formed at different positions along an axis of the sprocket carrier.

14. The multiple sprocket arrangement of claim 1, wherein the carrier has a multiplicity of webs for support which extend between the outer ring and the inner ring.

15. The multiple sprocket arrangement of claim 14, wherein radially outer ends of the webs are directed into carrier projections of the outer ring.

16. The multiple sprocket arrangement of claim 1, wherein spacers are disposed between the smaller sprockets.

17. The multiple sprocket arrangement of claim 16, wherein an additional spacer is disposed between the smaller sprockets and the larger sprockets, the additional spacer being wider than the spacers disposed between the smaller sprockets.

18. The multiple sprocket arrangement of claim 17, wherein the number of sprockets comprises a total of at least eleven sprockets.

19. The multiple sprocket arrangement of claim 18, wherein a largest sprocket of the number of sprockets has at least 50 teeth.

20. The multiple sprocket arrangement of claim 19, wherein a smallest sprocket of the number of sprockets has at most 11 teeth.

* * * * *